(12) United States Patent
Volkerink et al.

(10) Patent No.: US 11,663,889 B2
(45) Date of Patent: May 30, 2023

(54) DETECTING TAMPERING IN ASSETS AND AUTHENTICATING AUTHORIZED USERS

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 3 days.

(21) Appl. No.: 17/330,353

(22) Filed: May 25, 2021

(65) Prior Publication Data

US 2021/0366251 A1 Nov. 25, 2021

Related U.S. Application Data

(60) Provisional application No. 63/029,675, filed on May 25, 2020, provisional application No. 63/085,992, filed on Sep. 30, 2020.

(51) Int. Cl.
*G08B 13/00* (2006.01)
*G06K 19/06* (2006.01)
*G06K 7/10* (2006.01)
*H04W 12/04* (2021.01)

(52) U.S. Cl.
CPC ......... *G08B 13/00* (2013.01); *G06K 7/10366* (2013.01); *G06K 19/06037* (2013.01); *H04W 12/04* (2013.01)

(58) Field of Classification Search
CPC ........ G08B 13/00; G08B 13/08; G08B 13/14; G08B 13/24; H04W 4/00; H04W 12/04; H04Q 9/00
See application file for complete search history.

(56) References Cited

U.S. PATENT DOCUMENTS

| | | | |
|---|---|---|---|
| 5,917,433 A | 6/1999 | Keillor et al. |
| 6,437,702 B1 | 8/2002 | Ragland |
| 6,522,874 B1 | 2/2003 | Chu et al. |
| 6,919,803 B2 | 7/2005 | Breed |
| 7,009,517 B2 | 3/2006 | Wood |

(Continued)

FOREIGN PATENT DOCUMENTS

| | | | |
|---|---|---|---|
| AU | 2018204317 A1 | 1/2019 |
| CA | 3008512 A1 | 12/2018 |
| WO | WO 2014153418 A1 * | 9/2014 |
| WO | 2018053309 A1 | 3/2018 |

OTHER PUBLICATIONS

NPL Search.*

(Continued)

*Primary Examiner* — Van T Trieu

(57) ABSTRACT

In some implementations, a wireless sensing system may receive sensor data associated with an asset. The sensor data may be associated with a tampering event and the tampering event may include an action performed on the asset. The wireless sensing system may further determine whether the tampering event is performed by an authorized user of the wireless sensing system. The wireless sensing system may further determine whether the tampering event is performed within an authorized location of the wireless sensing system. The wireless sensing system may transmit a notification to a user of the wireless sensing system. The notification may alert the user of the wireless sensing system that the tampering event has occurred.

24 Claims, 19 Drawing Sheets

(56) References Cited

U.S. PATENT DOCUMENTS

| | | | |
|---|---|---|---|
| 7,866,555 | B2 | 1/2011 | Schmid et al. |
| 8,095,070 | B2 | 1/2012 | Twitchell, Jr. |
| 9,228,911 | B1 | 1/2016 | Meyers |
| 9,886,799 | B2 | 2/2018 | Kwak |
| 10,758,943 | B1 | 9/2020 | Carpenter |
| 2002/0089434 | A1 | 7/2002 | Ghazarian |
| 2003/0089771 | A1 | 3/2003 | Cybulski et al. |
| 2004/0066274 | A1 | 4/2004 | Bailey |
| 2004/0224640 | A1 | 11/2004 | MacFarland |
| 2006/0187033 | A1 | 8/2006 | Hall et al. |
| 2007/0085677 | A1 | 4/2007 | Neff et al. |
| 2007/0095905 | A1 | 5/2007 | Kadaba |
| 2007/0164858 | A1 | 7/2007 | Webb, Sr. |
| 2007/0164863 | A1 | 7/2007 | Himberger et al. |
| 2009/0322510 | A1 | 12/2009 | Berger et al. |
| 2011/0127325 | A1 | 6/2011 | Hussey et al. |
| 2012/0075343 | A1 | 3/2012 | Chen et al. |
| 2013/0002443 | A1 | 1/2013 | Breed et al. |
| 2013/0211976 | A1 | 8/2013 | Breed |
| 2014/0062699 | A1 | 3/2014 | Heine et al. |
| 2015/0227245 | A1 | 8/2015 | Inagaki et al. |
| 2015/0312653 | A1* | 10/2015 | Avrahami ............... H04Q 9/00 340/870.07 |
| 2015/0366518 | A1 | 12/2015 | Sampson |
| 2017/0078950 | A1 | 3/2017 | Hillary et al. |
| 2018/0012472 | A1 | 1/2018 | Purcell |
| 2018/0165568 | A1 | 6/2018 | Khoche |
| 2018/0374039 | A1 | 12/2018 | Walden et al. |
| 2020/0223066 | A1 | 7/2020 | Diankov et al. |
| 2020/0285726 | A1* | 9/2020 | Kalous ............... H04L 63/0853 |
| 2020/0405223 | A1 | 12/2020 | Mai et al. |

OTHER PUBLICATIONS

U.S. Appl. No. 16/776,804, Non-Final Office Action dated Jul. 15, 2021, 9 pages.
U.S. Appl. No. 16/517,508, Non-Final Office Action dated Jan. 7, 2021, 10 pages.
U.S. Appl. No. 16/517,508, Non-Final Office Action dated May 6, 2020, 35 pages.
International Patent Application No. PCT/US2021/053028, International Search Report and Written Opinion dated Jan. 12, 2022, 11 pages.
PCT Application No. PCT/US2020/014521 International Preliminary Report on Patentability, dated Jul. 27, 2021, 6 pages.
International Patent Application No. PCT/US2021/034112, International Search Report and Written Opinion dated Oct. 22, 2021, 14 pages.
Nisarga et al. "System-Level Tamper Protection Using MSP MCUs." Texas Instruments, Aug. 2016, 13 pages.
Sanchez et al., Machine Learning on Difference Image Analysis: A Comparison of Methods for Transient Detection, arXiv:1812.10518v2 [astro-ph.IM] Aug. 8, 2019, 17 pages.
U.S. Appl. No. 16/776,804, Final Office Action dated Feb. 3, 2022, 20 pages.
International Patent Application No. PCT/US2022/013729 International Search Report and Written Opinion dated Jun. 6, 2022, 11 pages.
International Patent Application No. PCT/US2022/015161 International Search Report and Written Opinion dated Jul. 1, 2022, 15 pages.
U.S. Appl. No. 16/776,804 Notice of Allowance dated Jun. 23, 2022, 10 pages.

* cited by examiner

DETECTING TAMPERING IN ASSETS AND AUTHENTICATING AUTHORIZED USERS

RELATED APPLICATIONS

This application claims priority to U.S. Patent Application Ser. No. 63/029,675, titled "Tamper Detecting Disposable Covert Tape", filed May 25, 2020, and to U.S. Patent Application Ser. No. 63/085,992, titled "Detecting Tampering in Assets and Authenticating Authorized Users," filed Sep. 30, 2020, each of which are incorporated herein in their entirety by reference.

BACKGROUND

In asset management, assets often contain sensitive, private, or other information or materials that are not meant to be accessed, except by authorized users. Additionally, businesses such as airports, hospitals, and the like may include wards, rooms, storage areas or storage containers, or buildings that contain sensitive or private information or materials that is not meant to be accessed by authorized users. Unauthorized access to assets or areas is considered to be a tampering event. It is valuable in asset and business management to determine when and where tampering events occur.

SUMMARY OF THE INVENTION

In an embodiment, a method for a wireless sensing system receives sensor data from a sensor associated with an asset. The sensor data represents a tampering event of the asset. The wireless sensing system determines whether the tampering event was authorized. The wireless sensing system determines whether the tampering event occurred at an authorized area. In response to one or both of: (1) the tampering event being unauthorized, and (2) the tampering event being performed within an unauthorized area, the wireless sensing system transmits a notification of the tampering event to a mobile device wirelessly connected to the wireless sensing system.

In an embodiment, a server is associated with a wireless sensing system that has a network of wireless nodes, that includes at least one processor and one memory communicatively coupled with the at least one processor, and stores machine-readable instructions that, when executed by the processor, cause the processor to receive a signal from a recently-activated wireless node of the network of wireless nodes at the server. The processor further adds an identifier of the recently-activated tape node to indicate that the recently-activated wireless node has joined the network of wireless nodes to a database, according to a classification of the tape node.

In an embodiment, a method for operating a wireless sensing system includes a first tape node attached to a first parcel. The first tape node has a first type of wireless communication interface and a second type of wireless communication interface that has a longer range than the first type of wireless communication interface. A second tape node is capable of communicating with the first tape node. A server establishes a wireless communication connection with the second type of wireless communication interface of the first tape node. The server designates the first tape node as a master node of the second tape node.

In an embodiment, a wireless sensing system has a primary electronic logging device (ELD) and a secondary ELD. The secondary ELD includes at least one processor and a memory communicatively coupled with the at least one processor and stores machine-readable instructions that, when executed by the processor, cause the processor to receive tape node data from a tape node associated with an asset proximate to the secondary ELD, the tape node data representing a tampering event performed on the asset. The processor compares the tape node data to a list of predetermined events, stored within the memory. The list of predetermined events includes one or more predetermined events and corresponding elements of tape node data associated with each of the one or more predetermined events. The processor determines, based on the comparison, that the tampering event does not match a predetermined event within the list of predetermined events. The processor executes, in response to the determination that the tampering event does not match a predetermined event, a particular contingency plan, based on the tampering event.

DETAILED DESCRIPTION OF THE EMBODIMENTS

Figure 1A:
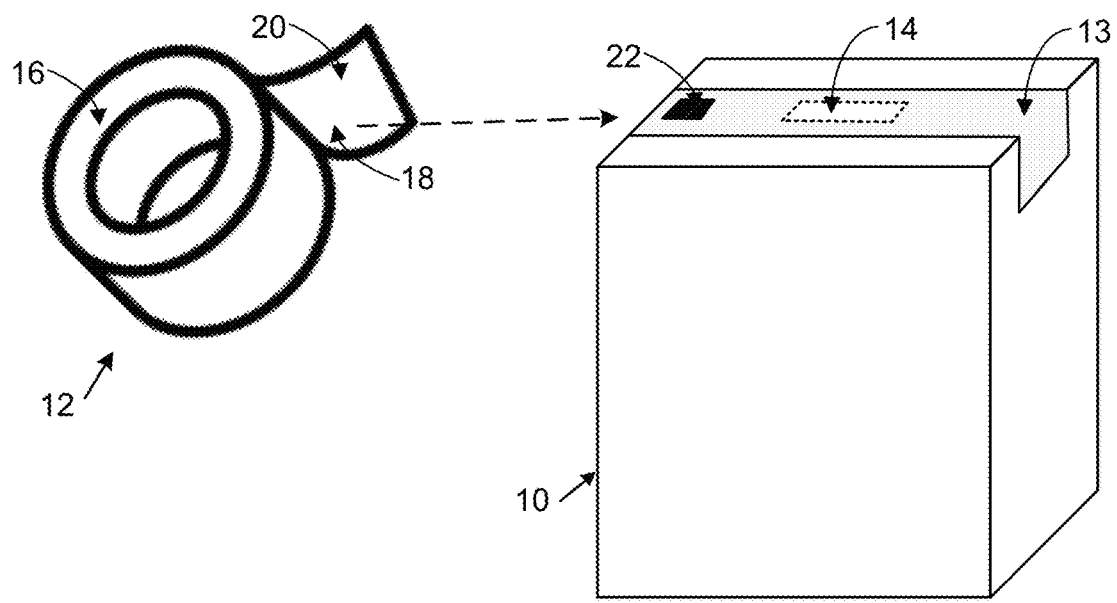
FIG. 1A is a diagrammatic view of a segment of an example adhesive tape platform dispensed from a roll used to detect tampering of an asset, according to an embodiment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "wireless node" or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "wireless sensing system," "hierarchical communications network," "distributed agent operating system," and the like are used interchangeably herein to refer to a system or network of wireless nodes.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality (e.g., sensor and energy harvesting functionality), and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

FIG. 1A shows an asset 10 that is sealed for shipment using an example adhesive tape platform 12 that includes embedded components of a wireless transducing circuit 14 (collectively referred to herein as a "tape node"). In this example, a segment 13 of the adhesive tape platform 12 is dispensed from a roll 16 and affixed to the asset 10. The adhesive tape platform 12 includes an adhesive side 18 and a non-adhesive side 20. The adhesive tape platform 12 may be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
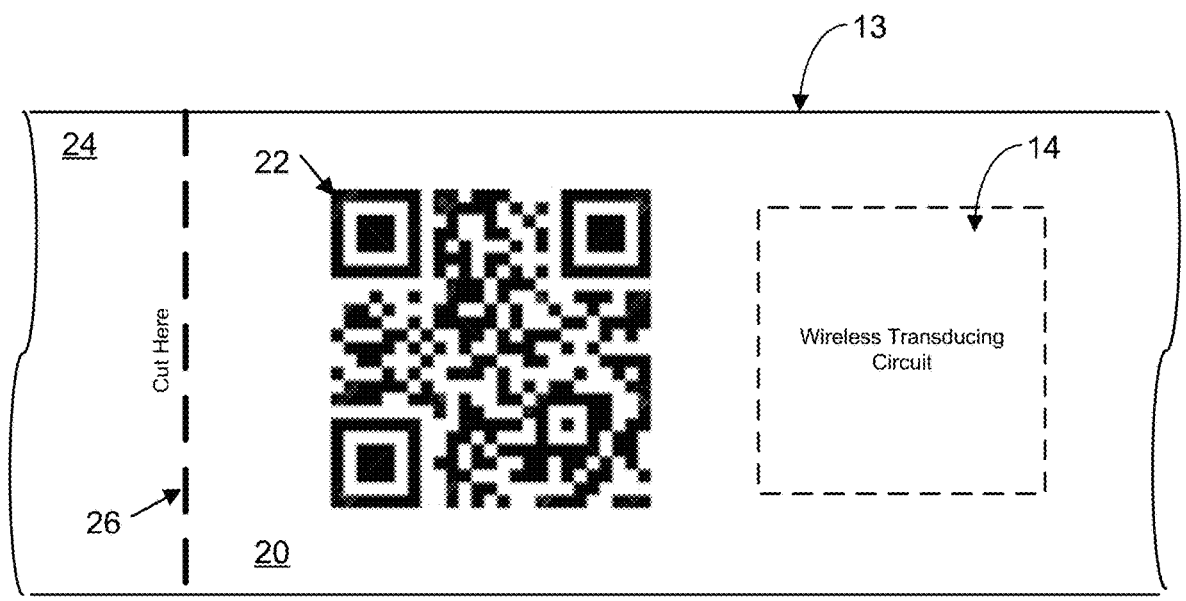
FIG. 1B is a diagrammatic top view of a portion of the segment of the example adhesive tape platform shown in FIG. 1A.

Referring to FIG. 1B, in some examples, the non-adhesive side 20 of the length of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length of the adhesive tape platform 12 includes a two-dimensional bar code 22 (e.g., a QR Code), written instructions 24 (i.e., "Cut Here"), and an associated cut line 26 that indicates where the user should cut the adhesive tape platform 12. The written instructions 24 and the cut line 26 typically are printed or otherwise marked on the top non-adhesive side 20 of the adhesive tape platform 12 during manufacture. The two-dimensional bar code 22, on the other hand, may be marked on the non-adhesive side 20 of the adhesive tape platform 12 during the manufacture of the adhesive tape platform 12 or, alternatively, may be marked on the non-adhesive side 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal an asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing circuit 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing circuit 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing circuit 14 in all of the segments 13 in the given length of the adhesive tape platform 12. In some of these examples, the energy sources are connected in parallel and concurrently activated to power the transducing circuit 14 in all of the segments 13 at the same time. In other examples, the energy sources are connected in parallel and alternately activated to power the transducing circuit 14 in respective ones of the adhesive tape platform segments 13 at different time periods, which may or may not overlap.

Figure 2:
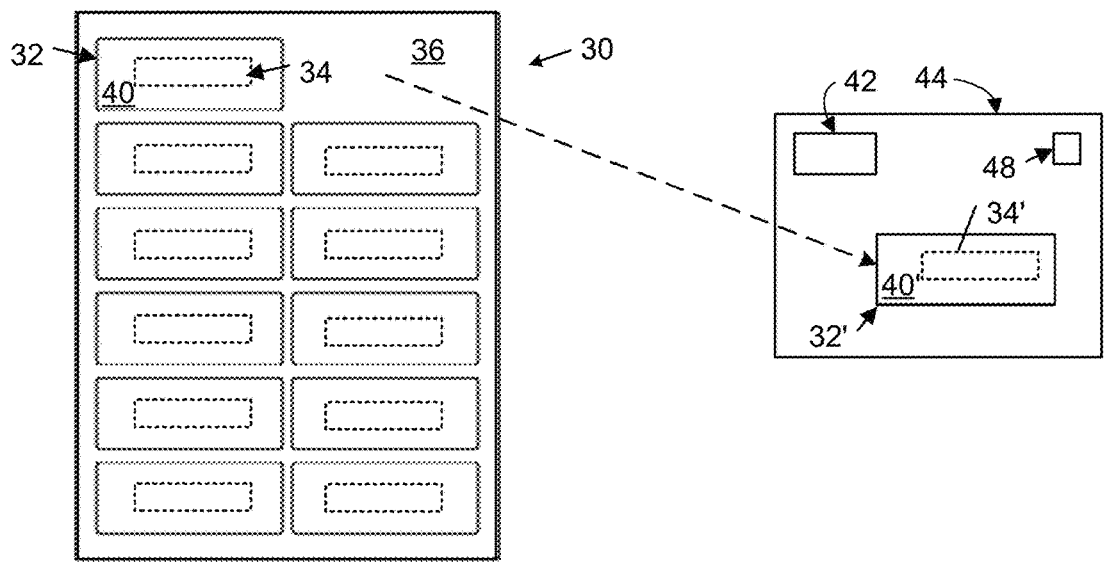
FIG. 2 is a diagrammatic view of an example of an envelope carrying a segment of an example adhesive tape platform dispensed from a backing sheet, according to an embodiment.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32 of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40 of the segment 32 may include any type of writing, markings, decorative designs, or other ornamentation. In the illustrated example, the non-adhesive side 40 of the segment 32 includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 36. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
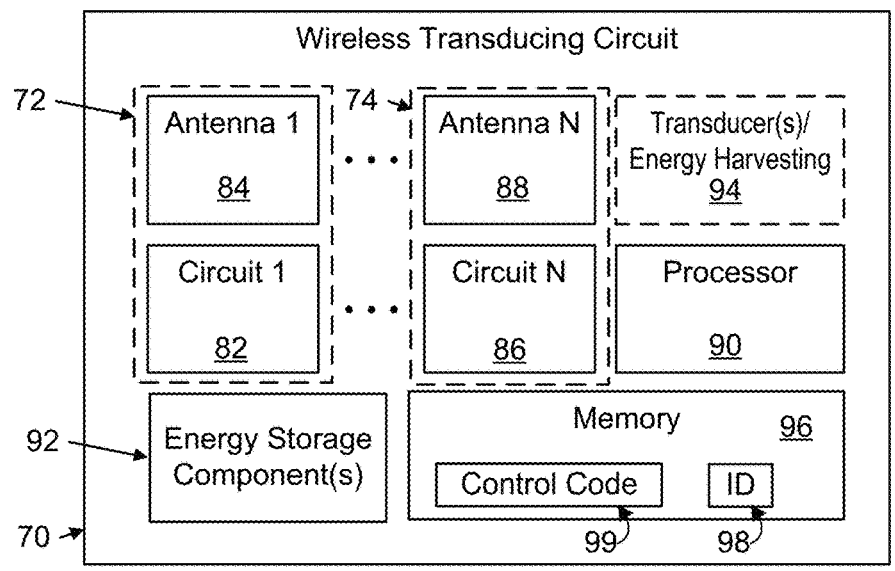
FIG. 3 is a schematic view of an example segment of an adhesive tape platform, according to an embodiment.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID number (TIN), and a media access control (MAC) ID, and control code 99. In some examples, the memory 96 may be incorporated into one or more of the processor 90 or transducers 94 or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions. In some examples, the example wireless transducing circuit 70 may be a peripheral wireless network node, as described herein.

Figure 4:
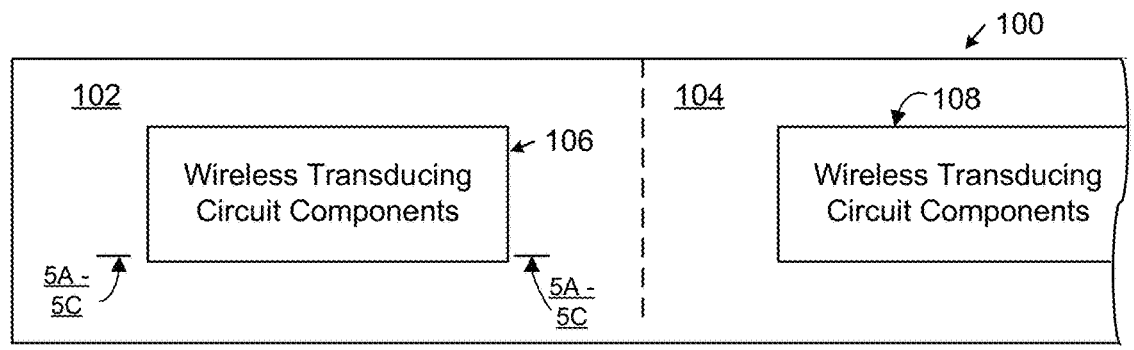
FIG. 4 is a diagrammatic top view of a length of an example adhesive tape platform, according to an embodiment.

FIG. 4 is a top view of a portion of an example flexible adhesive tape platform 100 that shows a first tape node 102 (the first tape node may be a first segment of the adhesive tape platform 100) and a portion of a second tape node 104 (the second tape node may be a second segment of the adhesive tape platform 100). Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other logistic functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
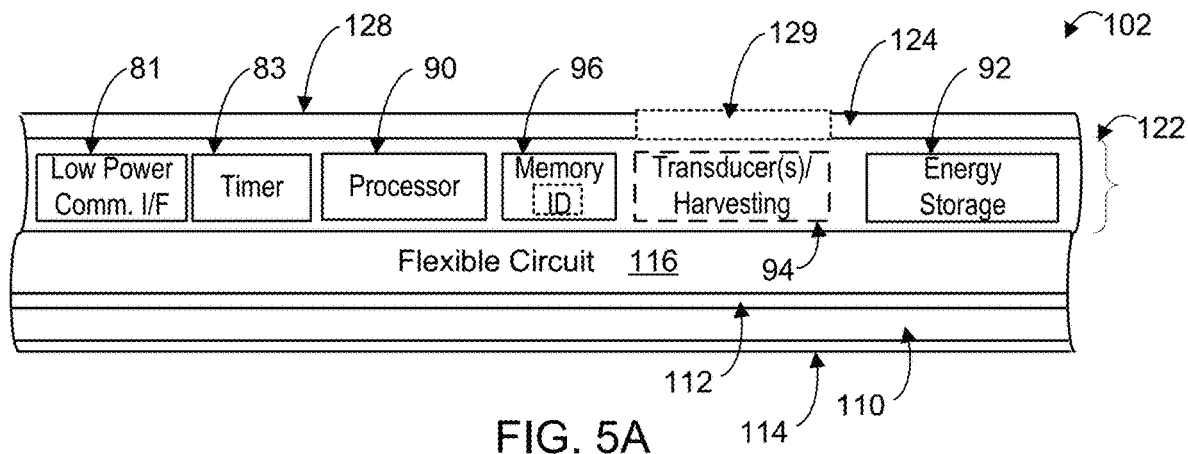
FIGS. 5A-5C show diagrammatic cross-sectional side views of portions of different respective adhesive tape platforms, according to an embodiment.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducers and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
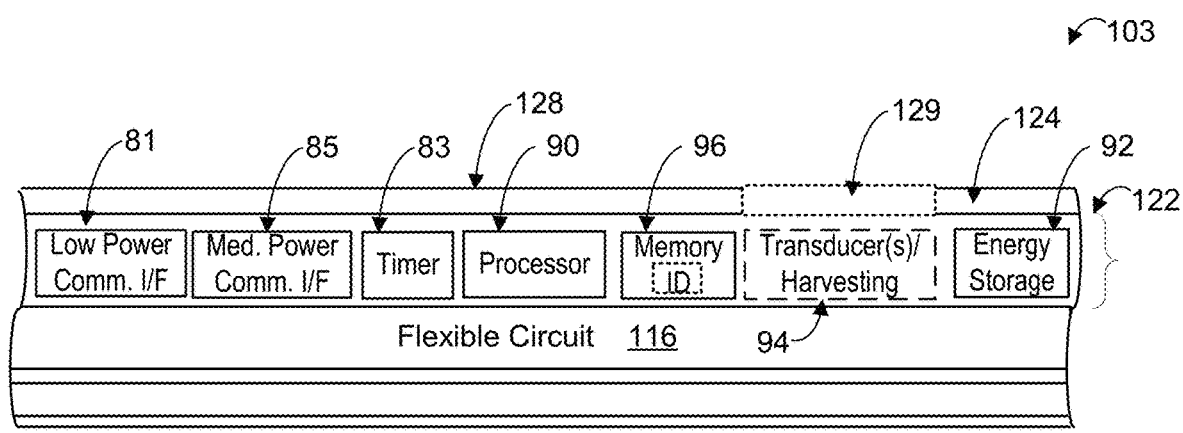

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
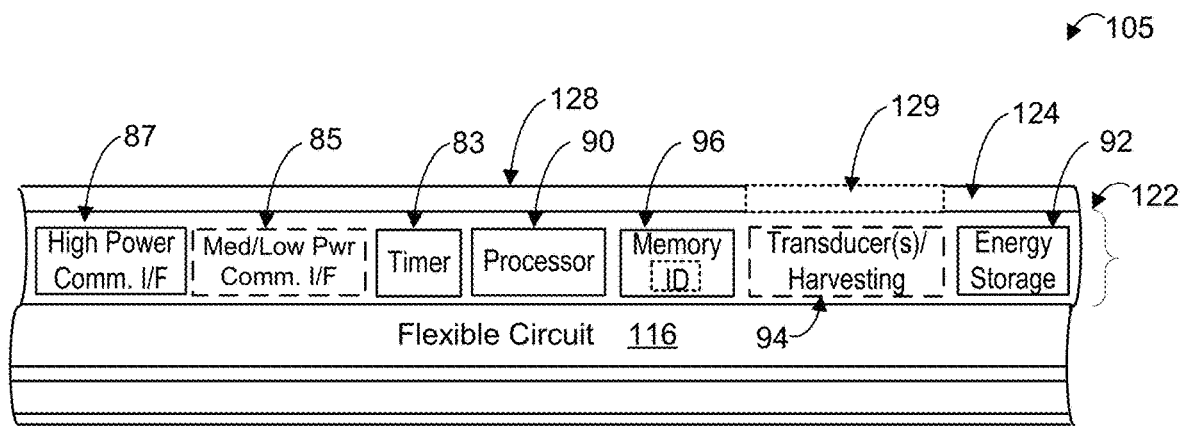

FIG. 5C shows a cross-sectional side view of a portion of an example tape node 105 of the flexible adhesive tape platform 100 that includes a respective set of the components of the wireless transducing circuit 106 corresponding to the third tape node type (i.e., black). In this example, the flexible adhesive tape platform segment 105 includes a high-power communications interface 87 (e.g., a cellular interface; e.g., GSM/GPRS) and an optional medium and/or low power communications interface 85. The high-power communication range provides global coverage to available infrastructure (e.g. the cellular network). In some examples, one or more other components of the flexible adhesive tape node 105 differ, for example, in functionality or capacity (e.g., larger energy source).

FIGS. 5A-5C show examples in which the flexible cover 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the flexible cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102, 103, 105 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers, with respect to FIG. 3) to their respective antennas 84, 88 (with respect to FIG. 3) and to the processor 90, and also connects the processor 90 to the one or more transducers 94 and the memory 96. The backside conductive pattern connects the active electronics (e.g., the processor 90, the communications circuits 82, 86 (with respect to FIG. 3) and the transducers) on the front-side of the flexible circuit 116 to the electrodes of the flexible battery (not shown) via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6:
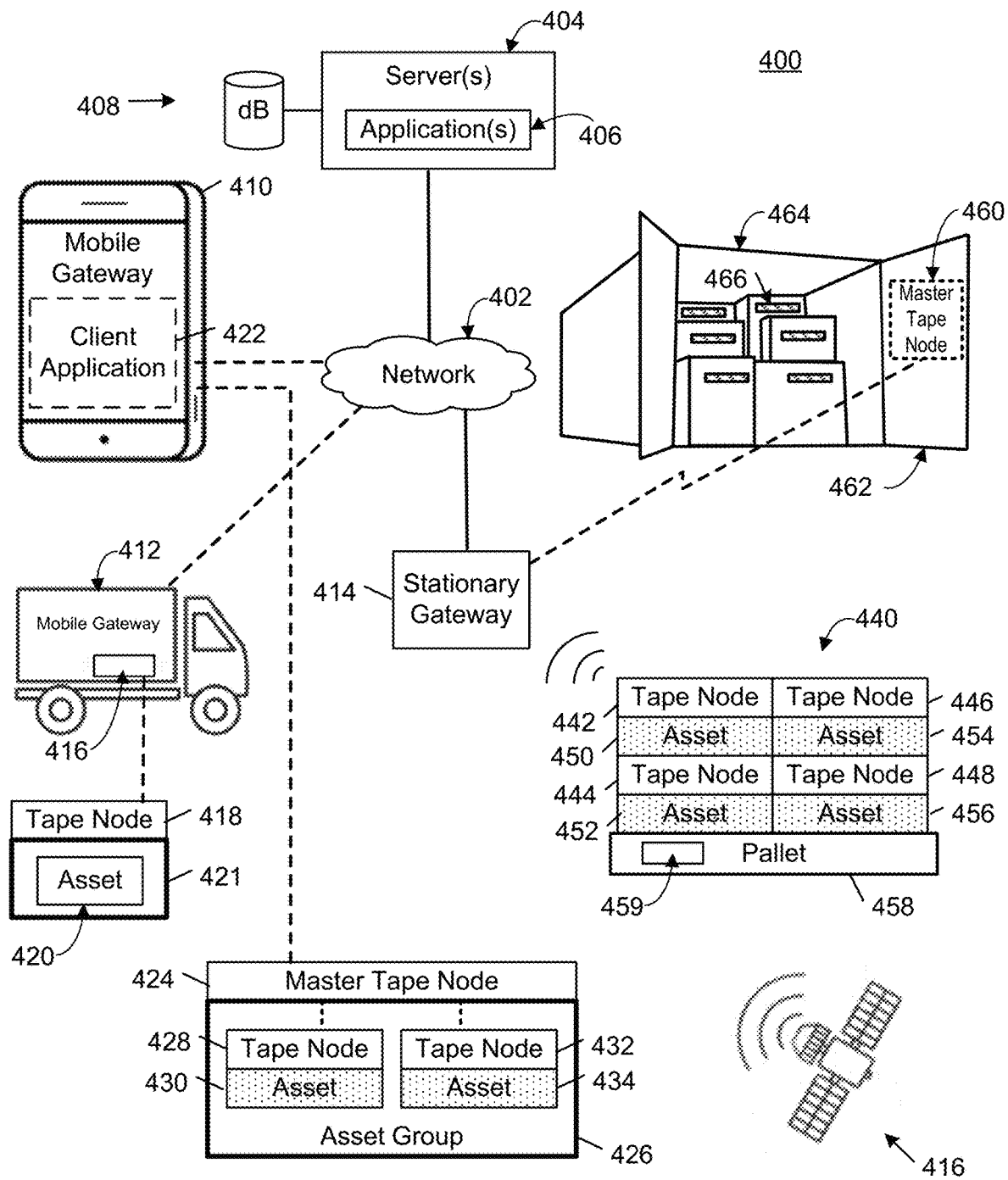
FIG. 6 is a diagrammatic view of an example of a network environment supporting communications with segments of an adhesive tape platform, according to an embodiment.

FIG. 6 shows an example network communications environment 400 that includes a network 402 that supports communications between one or more network service servers 404 executing one or more applications of a network service 408, mobile gateways 410, 412, a stationary gateway 414, and various types of tape nodes that are associated with various assets (e.g., parcels, equipment, tools, persons, and other things). In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system of a wireless communication unit 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a parcel, or other stationary or mobile object (e.g., a structural element of a warehouse, or a vehicle, such as a delivery truck) or stationary object (e.g., a structural element of a building). This process activates the tape node and causes the tape node to communicate with the one or more network service servers 404 of the network service 408. In this process, the tape node may communicate through one or more other tape nodes in the communication hierarchy. In this process, the one or more network service servers 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C that includes a lower power communications interface for communicating with tape nodes within range of the mobile gateway 412 and a higher power communications interface for communicating with the network 402. In this way, the tape node 418 and wireless communication unit 416 create a hierarchical wireless network of nodes for transmitting, forwarding, bridging, relaying, or otherwise communicating wireless messages to, between, or on behalf of the peripheral tape node 418 and the network service 408 in a power efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 410, 412 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column, or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 460 communicates with each of the peripheral tape nodes 466 and communicates with the stationary gateway 414 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402.

Alternatively, in some examples, the stationary gateway 414 also is operable to perform operations on the data received from the master tape node 460 with the same type of data produced by the master tape node 460 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way. In some examples, the master tape node 460 may take inventory of all the peripheral tape nodes 466 and may further send an alert to each of the peripheral tape nodes 466 that tampering may have occurred. When a, e.g., client device (of an authorized user) or peripheral tape nodes 466 scan or interact with it, a flag may be raised to the client device. The flag may be relayed to a server (e.g., one or more network service servers 404, with reference to FIG. 6). Continuing the example, if a tampered-with-asset continues on its route for delivery to an end-customer, it can still be detected at a later checkpoint (e.g., the parcel delivery can be stopped/aborted later on, even if it accidentally slips through).

In an example of the embodiment shown in FIG. 6, there are three classes of tape nodes: a short-range tape node, a medium range tape node, and a long-range tape node, as respectively shown in FIGS. 5A-5C. The short-range tape nodes typically are adhered directly to parcels containing assets. In the illustrated example, the tape nodes 418, 428, 432, 442-448, 466 are short-range tape nodes. The short-range tape nodes typically communicate with a low power wireless communication protocol (e.g., Bluetooth LE, Zigbee, or Z-wave). The medium range tape nodes typically are adhered to objects (e.g., a parcel 426 and a shipping container 464) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400.

In the illustrated example, the mobile gateway tape node 412 and the stationary gateway 414 are long-range tape nodes. Wireless communication unit 416 is a long-range tape node and includes a lower power communications interface for communicating with tape nodes within range of the mobile gateway 412. The long-range tape nodes (e.g., wireless communication unit 416) typically communicate with other nodes using a high-power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the one or more network service servers 404. In some examples, the stationary gateway 414 is a tape node that may be attached to a stationary structure (e.g., a wall) in the environment 400 with a known geographic location. In these examples, other tape nodes in the environment can determine their geographic location by querying the stationary gateway 414.

Figure 7:
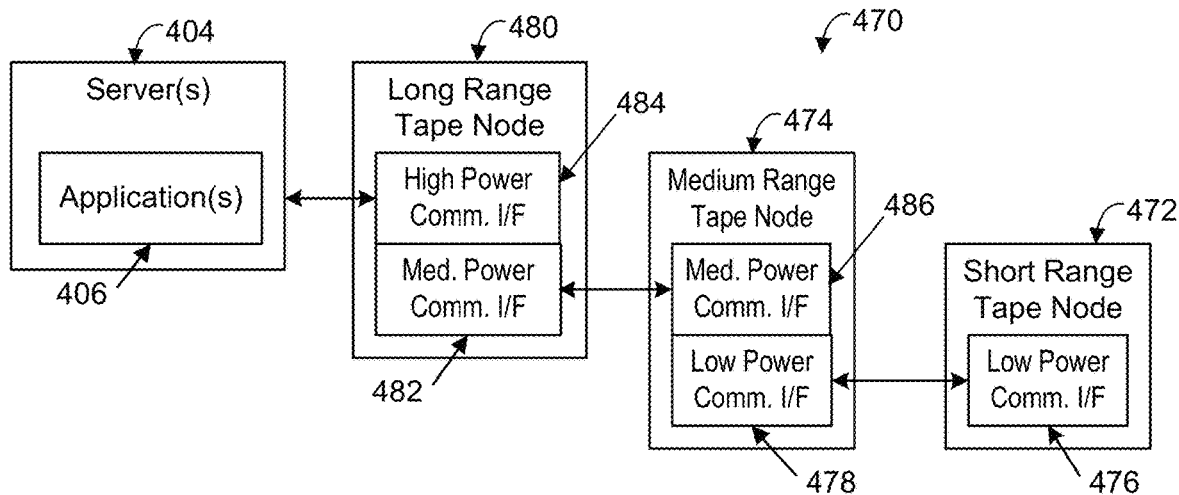
FIG. 7 is a diagrammatic view of a hierarchical communications network including an adhesive tape platform, according to an embodiment.

FIG. 7 shows an example hierarchical wireless communications network of tape nodes 470. In this example, the short-range tape node 472 and the medium range tape node 474 communicate with one another over their respective low power wireless communication interfaces 476, 478. The medium range tape node 474 and the long-range tape node 480 communicate with one another over their respective medium power wireless communication interfaces 478, 482. The long-range tape node 480 and the one or more network service servers 404 communicate with one another over the high-power communication interface 484. In some examples, the low power communication interfaces 476, 478 establish wireless communications with one another in accordance with the Bluetooth LE protocol, the medium power communication interfaces 486, 482 establish wireless communications with one another in accordance with the LoRa communications protocol, and the high-power communication interface 484 establishes wireless communications with the one or more network service servers 404 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 404 of the network service 408. The schedule usually dictates all aspects of the communication, including the times when particular tape nodes should communicate, the mode of communication, and the contents of the communication. In one example, the one or more network service servers 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 404, either directly or indirectly through a gateway tape node (e.g., the long-range wireless communication unit 416 adhered to the mobile gateway 412 (which could be a vehicle, ship, plane, etc.) or the stationary gateway 414 is a long-range tape node adhered to an infrastructure component of the environment 400). In other examples, the master tape node processes the information contained in the received data packets and transmits the processed information to the one or more network service servers 404.

Figure 8:
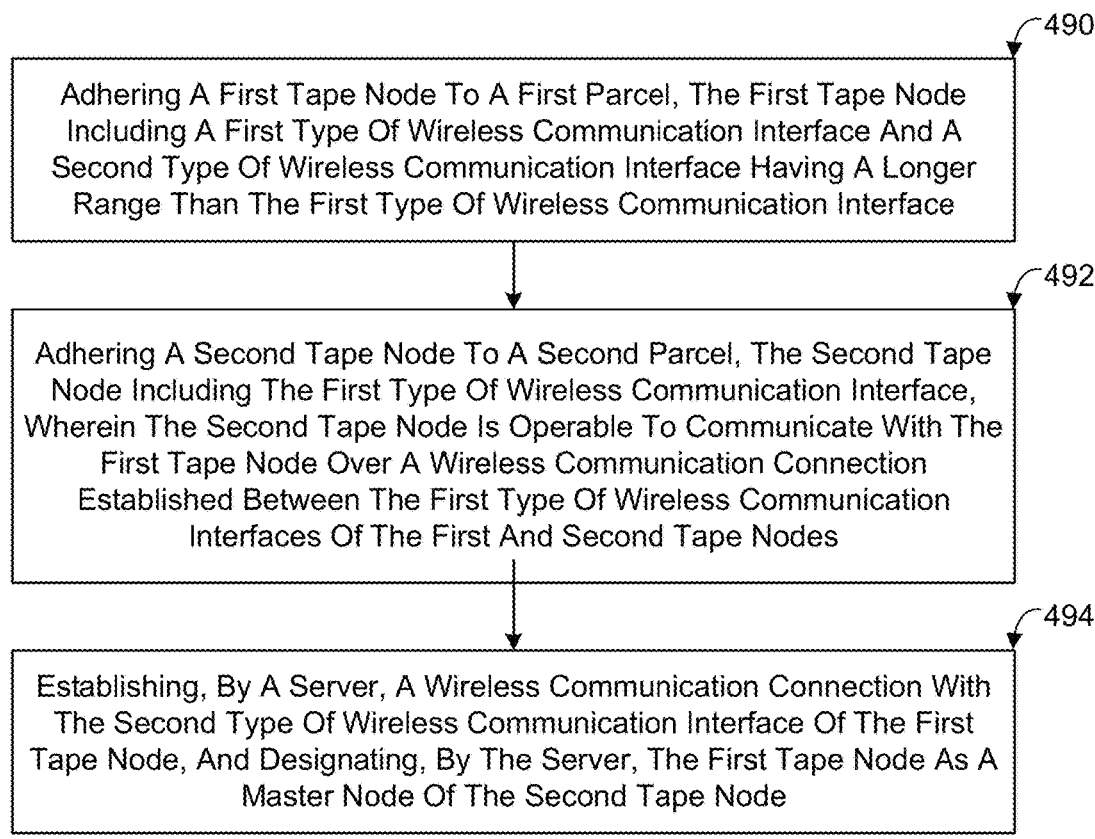
FIG. 8 is a flow diagram of a method of creating the hierarchical communications network, according to an embodiment.

FIG. 8 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 8, block 490). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 8, block 492). An application executing on a computer system (e.g., the one or more network service servers 404 of a network service 408) establishes a wireless communication connection with the second type of wireless communication interface of the first tape node, and the application transmits programmatic code executable by the first tape node to function as a master tape node with respect to the second tape node (FIG. 8, block 494).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 9A:
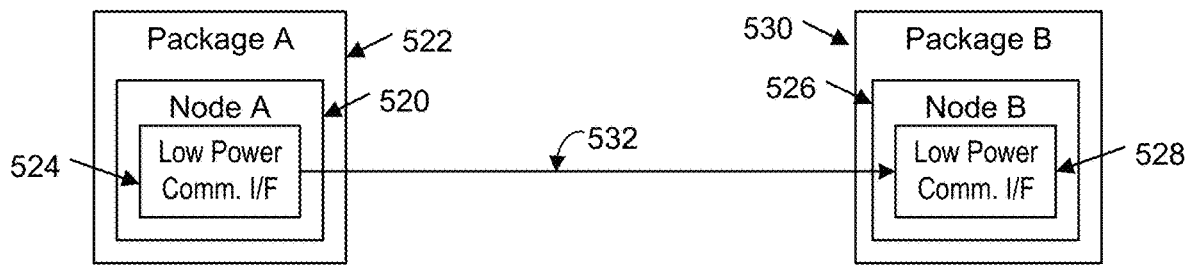
FIGS. 9A-9E are diagrammatic views showing example use cases for a distributed agent operating system, according to an embodiment.

Referring to FIG. 9A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 9B:
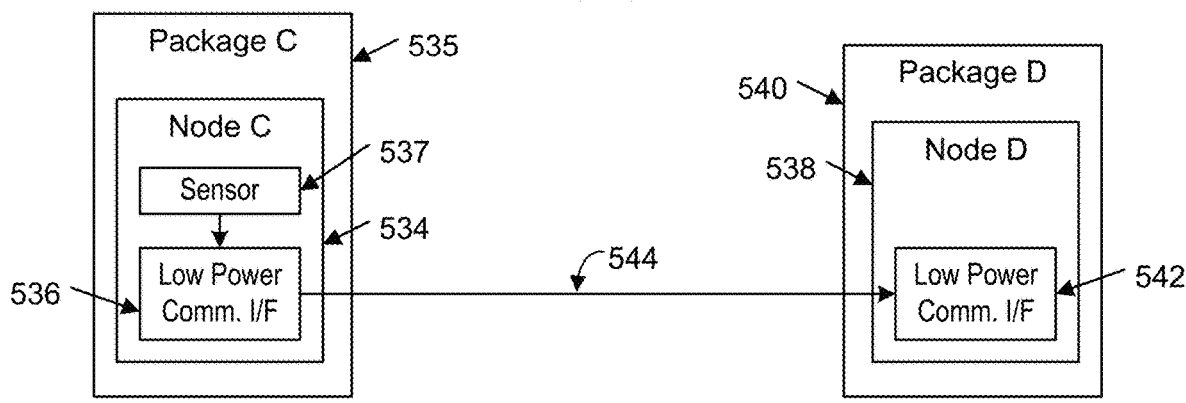

Referring to FIG. 9B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 9C:
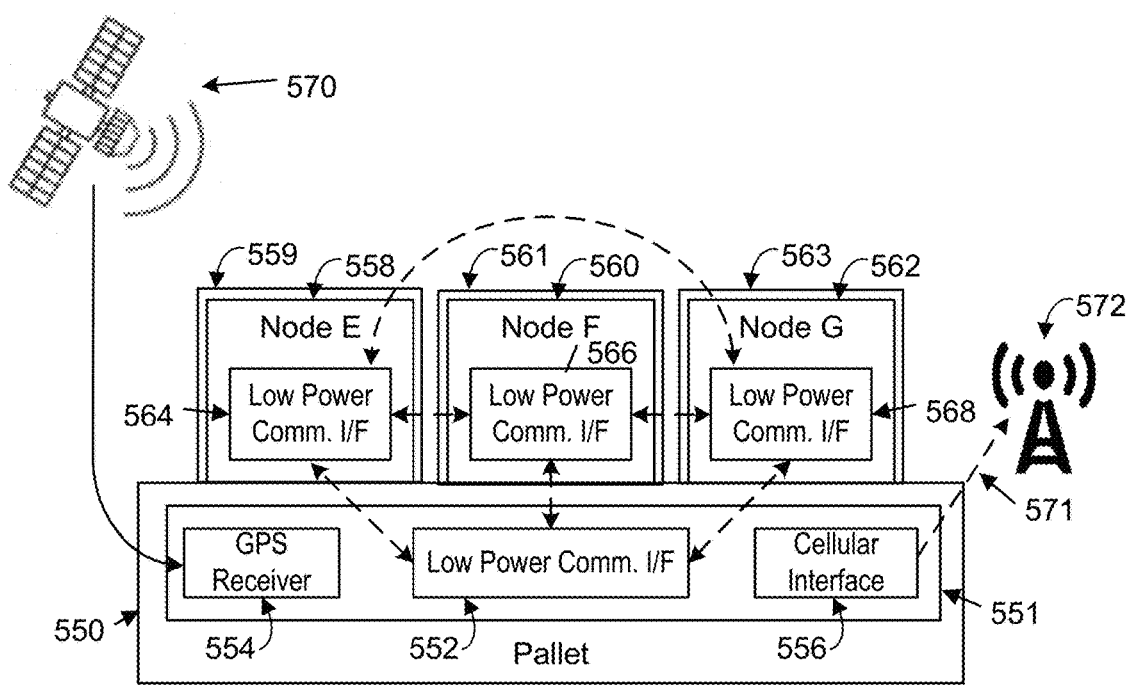

Referring to FIG. 9C, a pallet 550 is associated with a master node 551 that includes a low-power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G, and the master node 551 are connected to each of the other nodes over a respective low power communications path (shown by dashed lines).

In some embodiments, the packages 559, 561, 563 are grouped together because they are related. For example, the packages 559, 561, 563 may share the same shipping itinerary or a portion thereof. In an example scenario, the master pallet node 551 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 551 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cellular network 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if packages that are supposed to travel together no longer travel together and raise an alert. For example, a node (e.g., the master node 551 or one of the peripheral nodes 558, 560, 562) alerts the server when the node determines that a particular package 559 is being or has already been improperly separated from the group of packages. The node may determine that there has been an improper separation of the particular package 559 in a variety of ways. For example, the associated peripheral node 558 that is bound to the particular package 559 may include an accelerometer that generates a signal in response to movement of the package from the pallet. In accordance with its intelligent agent program code, the associated peripheral node 558 determines that the master node 551 has not disassociated the particular package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 9D:
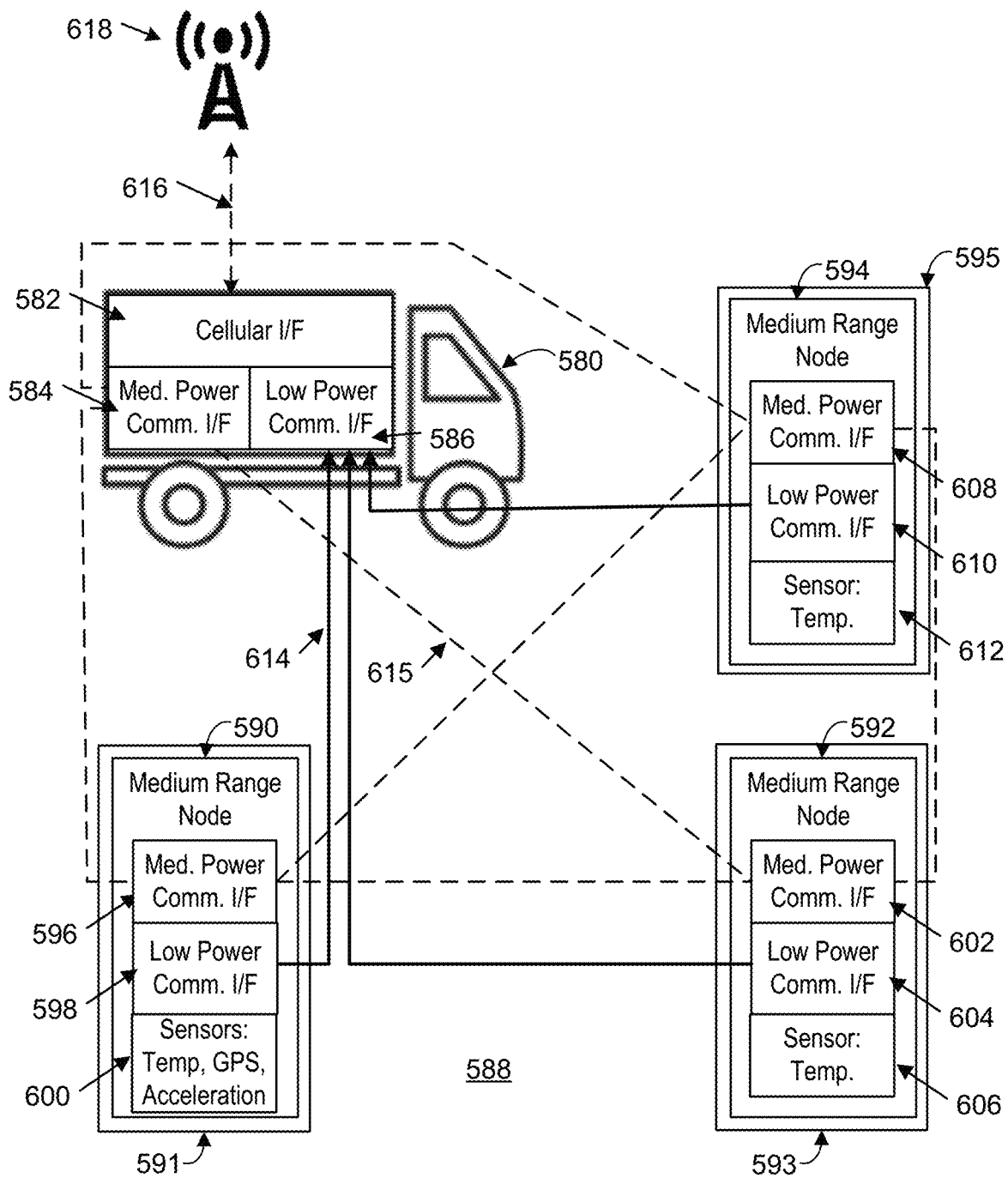

Referring to FIG. 9D, a truck 580 is configured as a mobile node or mobile hub that includes a cellular communications interface 582, a medium-power communications interface 584, and a low power communications interface 586. The communications interfaces 580-586 may be implemented on one or more tape and non-tape nodes. In an illustrative scenario, the truck 580 visits a logistic storage facility, such as a warehouse 588, to wirelessly obtain temperature data generated by temperature sensors in the medium range nodes 590, 592, 594. The warehouse 588 contains nodes 590, 592, and 594 that are associated with respective logistic containers 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective logistic containers 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the medium-power communication interface 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 9E:
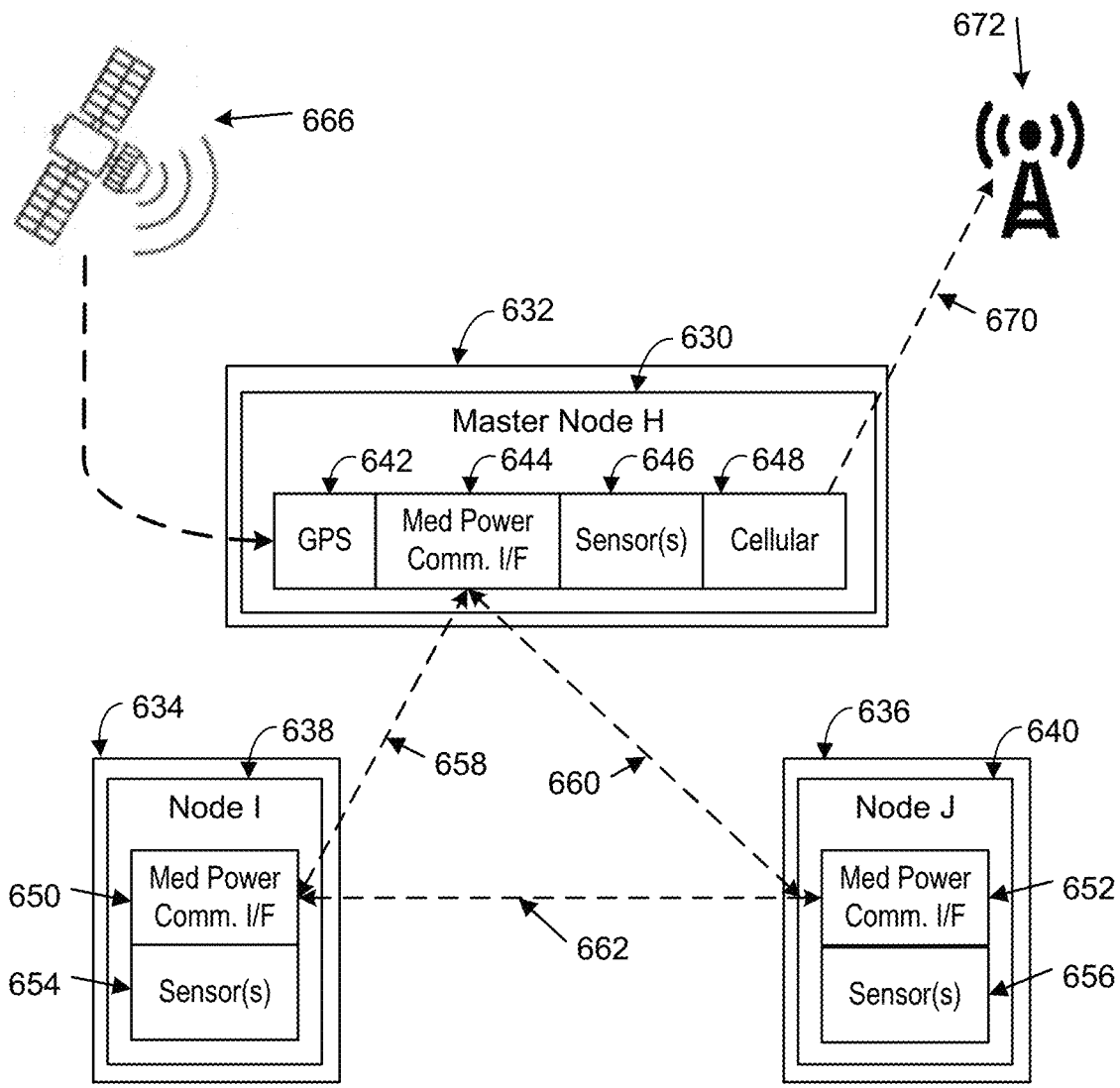

Referring to FIG. 9E, a master node 630 is associated with a logistic item 632 (e.g., a package) and grouped together with other logistic items 634, 636 (e.g., packages) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630, 638, 640 communicate through respective LoRa communications interfaces over LoRa formatted communications paths 658, 660, 662.

In the illustrated embodiment, the master and peripheral nodes 630, 638, 640 include environmental sensors for obtaining information regarding environmental conditions in the vicinity of the associated logistic items 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that they are authorized to connect to the master node 630, the peripheral nodes 638, 640 will attempt to pair with the master node 630. In this process, the peripheral nodes 638, 640 and the master node 630 determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the logistic items 634, 636 from the master node 630 can be estimated based on the average signal strength of the advertising packets that the master node 630 receives from the respective peripheral node. The master node 630 can then transmit its own location and the locations of the package nodes H, J, and I to a server over a cellular interface connection with a cellular network 672. Other methods of determining the distance of each of the logistic items 634, 636 from the master node 630, such as Received Signal-Strength Index (RSSI) based indoor localization techniques, also may be used.

In some embodiments, after determining its own location and the locations of the peripheral nodes, the master node 630 reports the location data, the collected and optionally processed (e.g., either by the peripheral nodes peripheral nodes 638, 640 or the master node 630) sensor data to a server over a cellular communication path 670 on a cellular network 672.

Figure 10A:
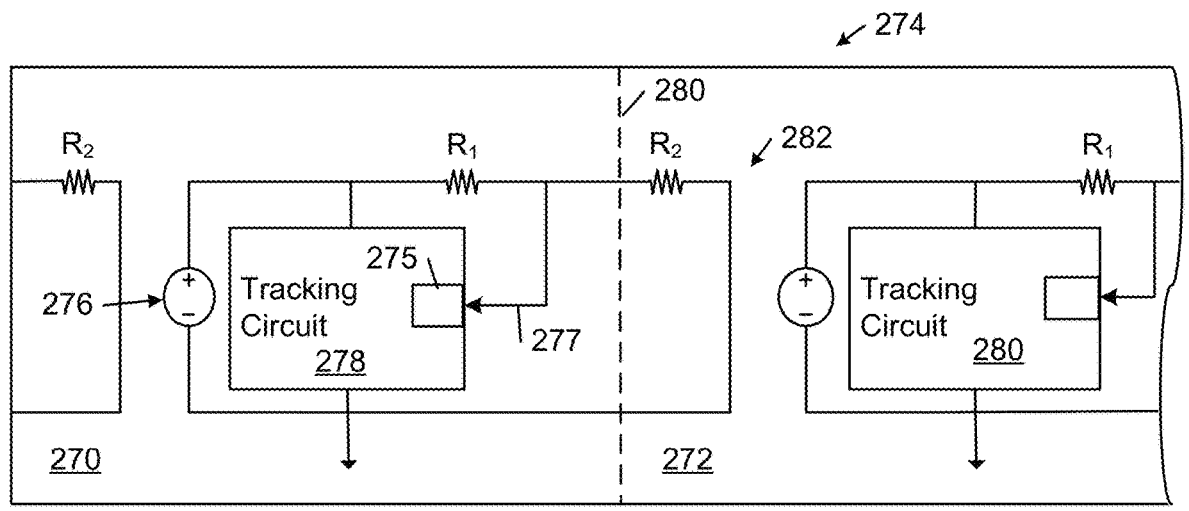
FIG. 10A-B are diagrammatic top views of a length of an example tracking adhesive tape product, according to an embodiment.

Referring to FIG. 10A, in some examples, each of one or more of the segments 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on-state to power-on the segment 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 10B:
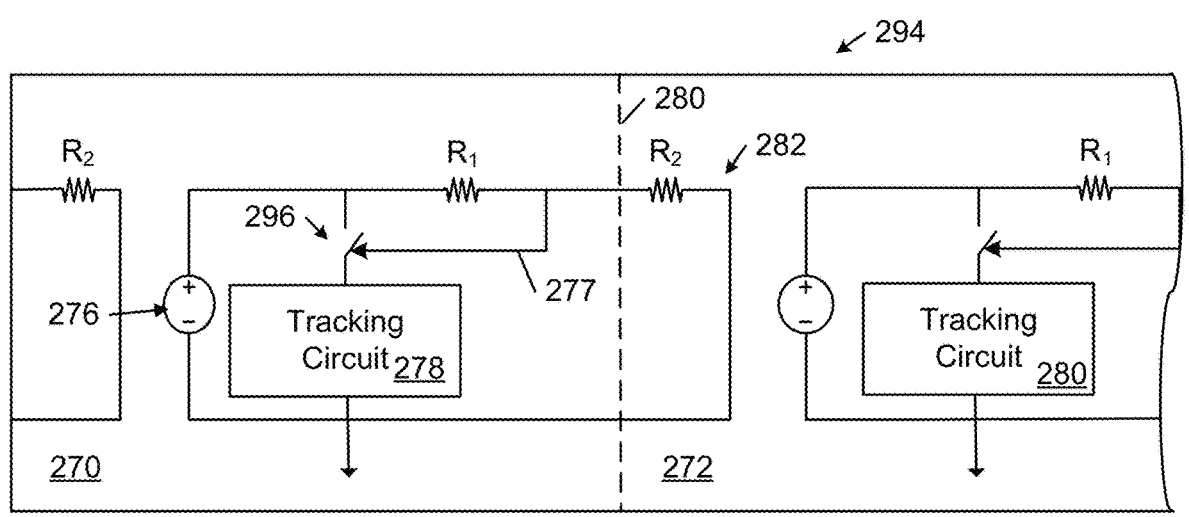

FIG. 10B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 13A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors R1 and R2. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 11A:
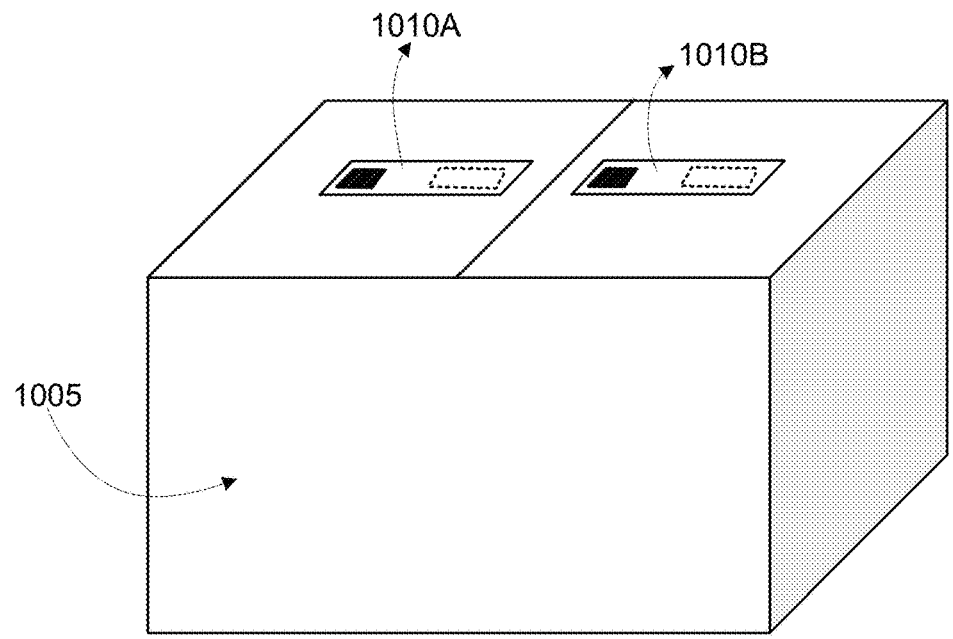
FIG. 11A-11C show example illustrations of adhesive tape platform affixed to assets configured to detect tampering events and to authenticate authorized users, according to an embodiment.

FIG. 11A illustrates an example embodiment wherein an asset 1005 is associated with two wireless nodes 1010A, B that detect each of the other wireless nodes by proximity, such that when a distance between the wireless nodes increases, an asset is considered to have been opened and a tampering event is recorded. For example, a first wireless node 1010A communicates with a second wireless node 1010B. The second wireless node 1010B determines a distance between the second wireless node and the first wireless node 1010A, e.g., based on signal strength of the received communication. Responsive to the distance being within a threshold (e.g., 6 in.), the second wireless node 1010B determines that the asset has not been opened and that a tampering event has not occurred.

In the example of FIG. 11A, the asset 1005 is a sealed box. In other examples, the asset 1005 may be another type of package, a door to a building, storage container, safe, or the like. In other examples, thresholds may be less than or greater than the example shown in FIG. 11A and may be configured by a user based on the asset type, dimension, or other associated factors.

In some embodiments, there may be a single tape node (e.g., tracking adhesive product 274, 294, with respect to FIGS. 10A, B) across each of the two flaps of the asset 1005, such that when the asset is opened, and the flaps are separated, a tear results in the circuitry of the tape node (e.g., designated cut-line 280 may be a designated tear line). This tearing may disable the tape node, alerting the server (e.g., server 404) or a master tape node (e.g., master tape node 424) that the asset has been opened and that a tampering event has occurred. In some embodiments, the tape node may, in response to the tear, determine that a tampering event has occurred. In some embodiments, there may be one or more tape nodes attached to the asset 1005 that include an accelerometer for when the flaps are opened, the accelerometer may detect the angular acceleration of the flaps opening. The tape node may determine the acceleration has satisfied a predetermined threshold and, from this, determine that a tampering event has occurred.

In some embodiments, there may be three or more tape nodes positioned on the asset 1005, such that a server or the positioned tape nodes are able to triangulate the location of the tape nodes, with respect to each other, or the location of the asset. When one of the tape nodes are moved, such that the tape nodes are no longer able to establish a location of the asset 1005 or the other tape nodes, this may trigger the tape nodes, or a server, to determine that a tampering event has occurred.

Figure 11B:
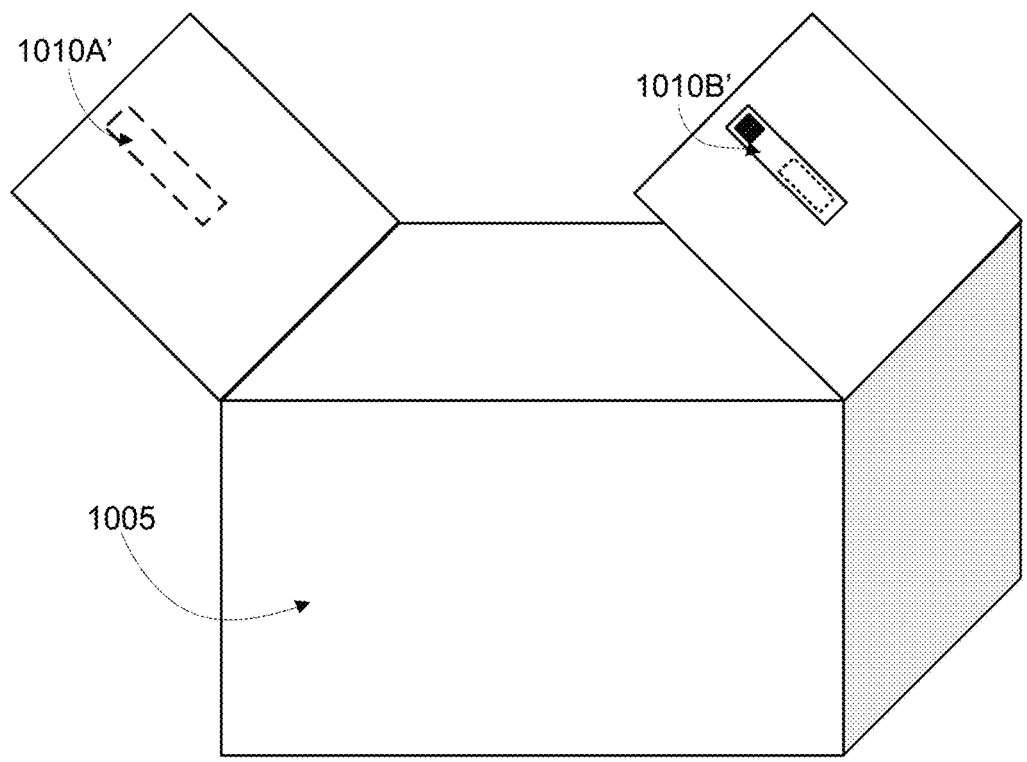

FIG. 11B illustrates an example embodiment wherein an asset 1005 associated with two wireless nodes 1010A', B' experiences a tampering event. The first wireless node 1010A' communicates with the second wireless node 1010B'. The second wireless node 1010B' determines a distance between the second wireless node and the first wireless node 1010A'. Responsive to the distance exceeding a threshold, the second wireless node 1010B' determines that the asset has been opened and that a tampering event has occurred. In an embodiment, the second wireless node 1010B' communicates to a mobile device of a user or to a gateway node that the tampering event has occurred to notify the user of the wireless sensing system. A notification of the tampering event may include an alarm, a location of the asset during the tampering event, and a time of the tampering event. In other embodiments, additional, fewer, or different information may be included in the notification.

In other embodiments, a wireless node comprises an orientation sensor and a tampering event is determined based on an asset being moved to or beyond a specified orientation or a range of orientations (e.g., turned upside down). The orientation of the asset may be determined by placing a wireless node (comprising an orientation sensor) on each of two or more different surfaces of the asset (e.g., opposite sides of the asset, if the asset has a shape corresponding to a polyhedron).

In other embodiments, a wireless node comprises a vibration sensor and a tampering event is determined based on sensor signals corresponding to tampering actions such as drilling through a portion of the asset, cutting through a portion of the asset, damaging a portion of the asset, denting a portion of the asset, striking the portion of an asset with a tool (e.g., hammer or crowbar), opening a portion of the asset (e.g., a lid, door, or cap), shaking the asset, other movement, or some combination thereof. In other embodiments, a wireless node adhered to the inside of an asset comprises a light sensor and a tampering event is determined responsive to the optical sensor detecting light (e.g., an asset being opened and exposed to natural or artificial light). In other embodiments, a wireless node comprises an acoustic sensor and a tampering event is determined responsive to noise levels exceeding a threshold amount. In other embodiments, a wireless node is adhered across an opening of an asset (e.g., across a lid of a box, across a doorway) or applied to an asset in such a way that tampering with the asset requires tearing or cutting the wireless node (e.g., applied across or around the handle of a lever), and a tampering event is determined responsive to the wireless node being torn or broken. In certain embodiments, tearing the wireless node results in a circuit of the wireless node being altered (e.g., an open circuit state, short circuit state, other alteration of the circuit), and the tearing of the wireless node is detected based on the alteration of the circuit. In other embodiments, tearing of the wireless node may be detected based on a functionality of the wireless node changing (e.g., the wireless node no longer transmits a signal to the sensing system). In other embodiments, a wireless node is placed on the interior of or adhered to an internal surface of a metal asset (e.g., a trailer or truck; a metal container; machinery), wherein connection between the wireless node within the metal asset and other nodes or gateways of the wireless sensing system outside of the metal asset is restricted within the metal asset (e.g., due to electromagnetic shielding), and a tampering event is determined responsive to a connection being re-established between the wireless node within the metal asset and other nodes or gateways of the wireless sensing system, indicating that a portion of the metal asset has been opened. In other embodiments, combinations of the above or other sensors may be used to identify tampering.

Waveforms or signatures of signals from sensors in a wireless node corresponding to an asset may correlate to specific tampering events. For example, drilling a hole in a portion of an asset may have a corresponding waveform that is sensed by a vibration sensor on a wireless node adhered to the asset. A tampering event may be detected by determining that a signal from the vibration sensor has a waveform corresponding to the drilling waveform. Signals from the sensors used to detect tampering events may be input to a trained machine learning model which classifies events based on input signals. For example, a waveform of vibrations measured by a vibration sensor over time may be input to a trained machine learning model which outputs whether or not the waveform corresponds to an occurrence of a tampering event. For example, the trained machine leaning model may differentiate between the vibration from a truck engine and tampering of the asset. The machine learning model may be trained using sensor signals from one or more wireless nodes.

The wireless sensing system includes a plurality of wireless nodes further configured to authenticate authorized users and/or safe zones (e.g., an authorized area). Authorized users are, for example, employees or individuals authorized to access, open, or otherwise handle assets containing sensitive or private information or materials. For example, in an airport, border patrol personnel may be designated as authorized individuals that may open and inspect assets. Safe zones are areas in which assets may be accessed, opened, or otherwise handled. For example, an airport may designate a security area as a safe zone (e.g., an authorized area) wherein assets may be opened and handled for inspection purposes.

Figure 11C:
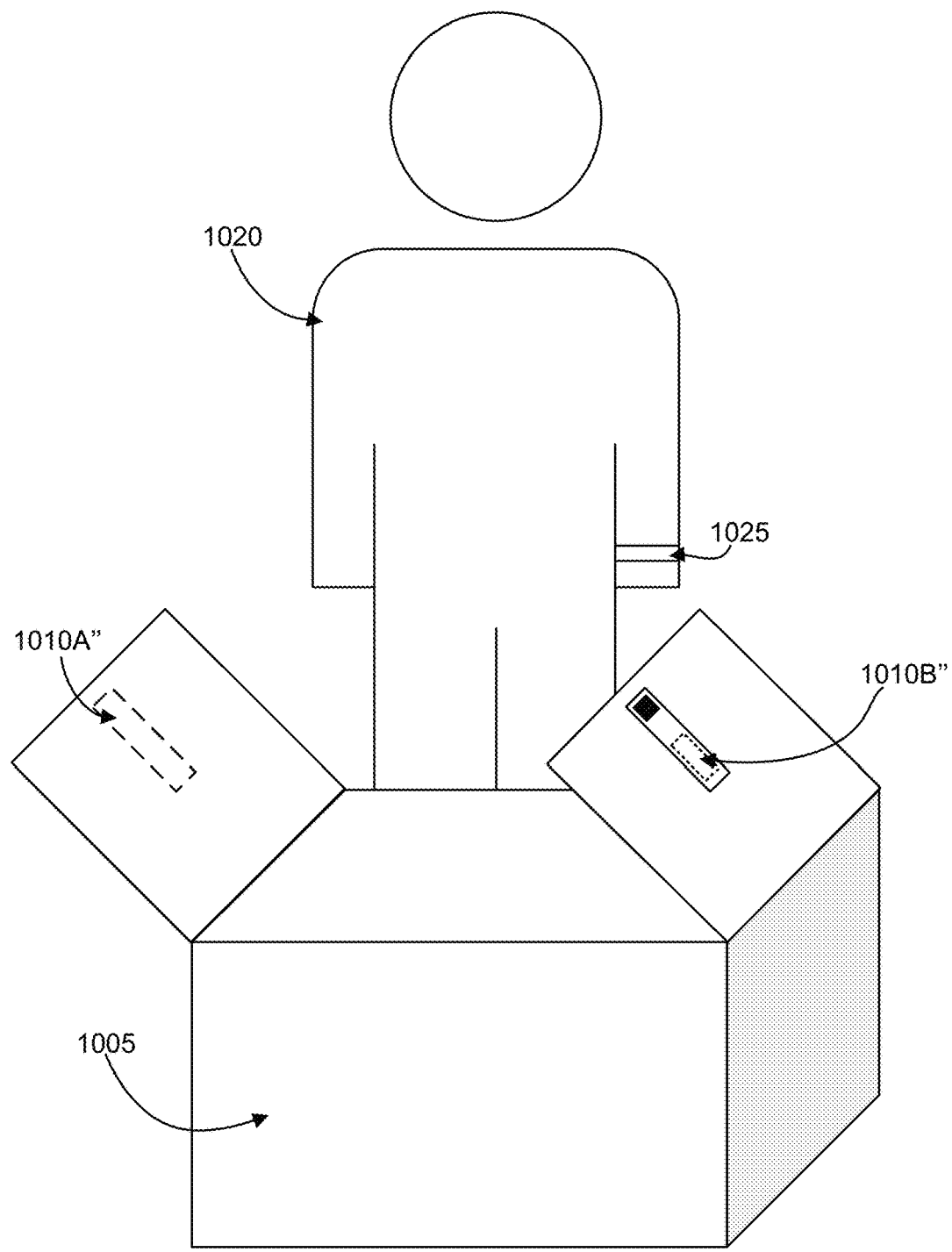

FIG. 11C illustrates an example embodiment wherein wireless nodes 1010A", B" associated with assets 1005 communicate with wireless nodes or devices 1025 associated with a user 1020 to provide authentication. In the embodiment of FIG. 11C, a tampering event is detected by the wireless nodes 1010A" and 1010B" as discussed previously in conjunction with FIG. 11B. A wireless node 1010B" further receives a communication from a wireless node associated with an authorized user 1020 of the wireless sensing system or a device 1025 of a user 1020 of the wireless sensing system. The device 1025 may be a client device (e.g., a smartphone), a wireless node of the wireless sensing system, a wearable device (e.g., a smartwatch), a badge (e.g., that includes an RFID chip, Bluetooth, or NFC), another device, or some combination thereof. In an embodiment, the communication includes an authorization key, identification of the user 1020, an encryption key, or another type of authorization information. Based on the received information, the wireless node 1010B" determines that the event is not a tampering event (e.g., is an official inspection of the asset 1005) and that the event should not cause an alert and/or should not be reported. In some embodiments, the device 1025 may notify the wireless nodes 1010A" and 1010B" that tampering may be "allowed" for a period of time (e.g., five or ten minutes) or for as long as the asset 1005 is within an authorized zone (e.g., the safe zone 1802, with reference to FIG. 18).

In other embodiments, devices 1025 may include local gateways associated with safe zones or locations, wireless nodes associated with wearable or portable smart devices (e.g., smart phones or watches), or other electronic devices. In another embodiment, devices 1025 may include gateways or black tapes adhered to trucks, trailers, other vehicles, or other transport containers including assets having wireless nodes.

In some embodiments, the wireless sensing system tracks and maintains information describing a line of custody, a history of authorized user interactions, a history of tampering events, and/or a history of movement and/or locations during transport. In an embodiment, the wireless sensing system transmits information to transit locations or end destinations of an asset prior to arrival of the asset at the transit locations or end destinations to provide, for example, authorization to handle and inspect the asset or other information associated with the asset. In some embodiments, the above information is included in a log. The log or a portion of the log may be transmitted to a client device, and a user may use the client device to inspect activity associated with the asset to determine if a tampering event has occurred.

According to some embodiments, a user (also referred to as a human operator, herein) of the wireless sensing system may locate an asset that has an associated wireless node using a client device, where a tampering event associated with the asset has been detected. The location of the asset may be displayed to the user on a user interface of the client device (e.g., the asset with the tampering event may be indicated on a map, floor plan, some other indicator of the asset's location, or some combination thereof). In some embodiments, the client device indicates the proximity of the user to the asset based on a signal strength of a connection with the wireless node associated with the asset. This way, the user may physically locate the asset that has been tampered with and manually inspect it upon receiving a notification of the tampering event.

Figure 12:
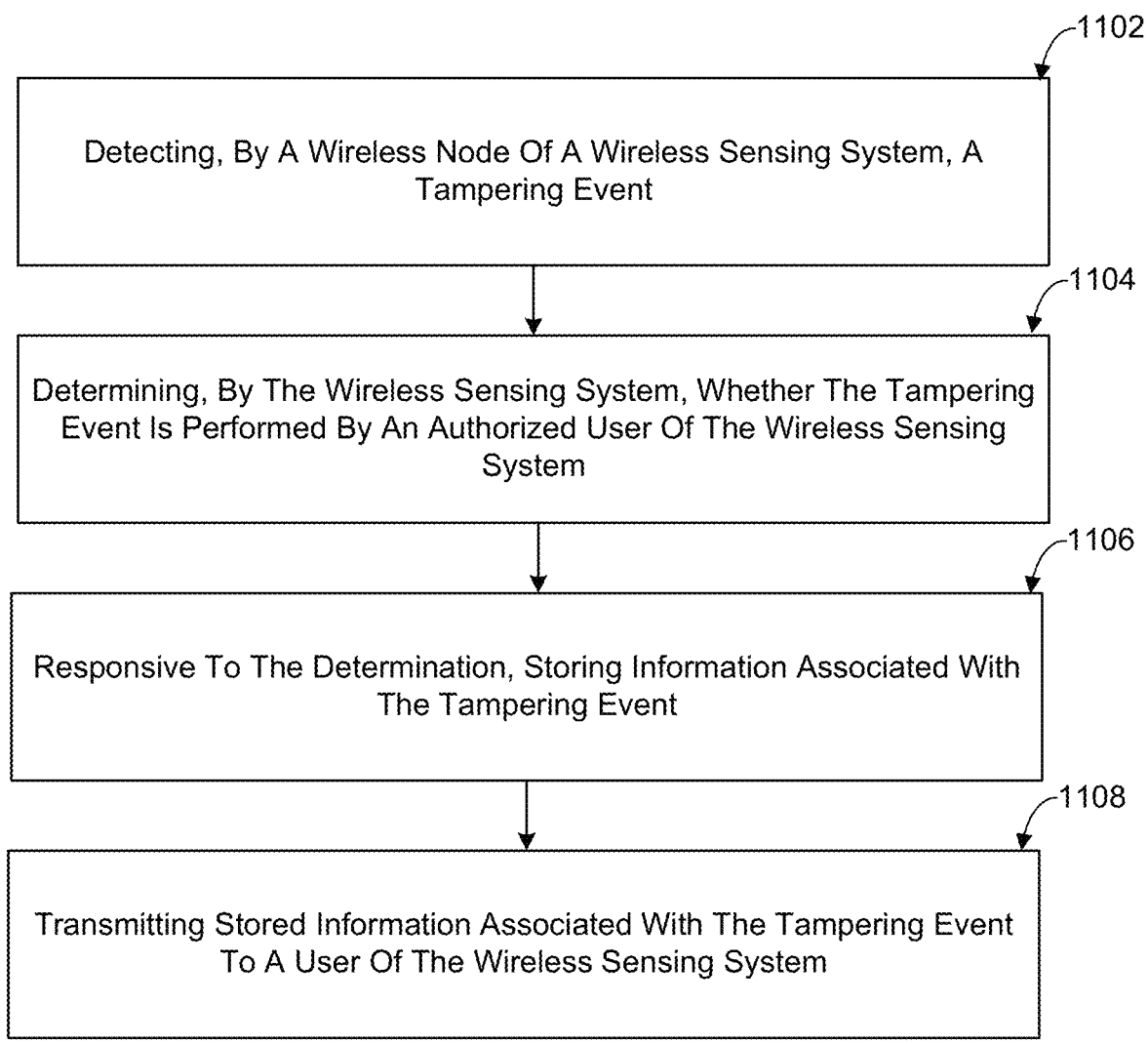
FIG. 12 is a flow diagram of one example method for detecting tampering by a segment of an adhesive tape platform, according to an embodiment.

FIG. 12 is a flow diagram of a method of detecting tampering in assets. A wireless node of a wireless sensing system detects a tampering event, wherein the tapering event comprises accessing or handling an asset (FIG. 12, block 1102). The wireless sensing system determines if the tampering event is performed by an authorized user (FIG. 12, block 1104). Responsive to the determination, the wireless sensing system stores information associated with the tampering event (FIG. 12, block 1106) and transmits the information describing the tampering event (FIG. 12, block 1108). In an embodiment, responsive to determining that the tampering event is not performed by an authorized user, the wireless sensing system transmits a notification to a user of the wireless sensing system to indicate that a tampering event has occurred.

In other embodiments, the method may include additional, fewer, or different steps, and the steps may be performed in a different order. In other embodiments, steps of the method may be performed by different components of the wireless sensing system. For example, in an embodiment, a wireless node of the wireless sensing system performs the detecting, the determining, the storing, and the transmitting.

Figure 13:
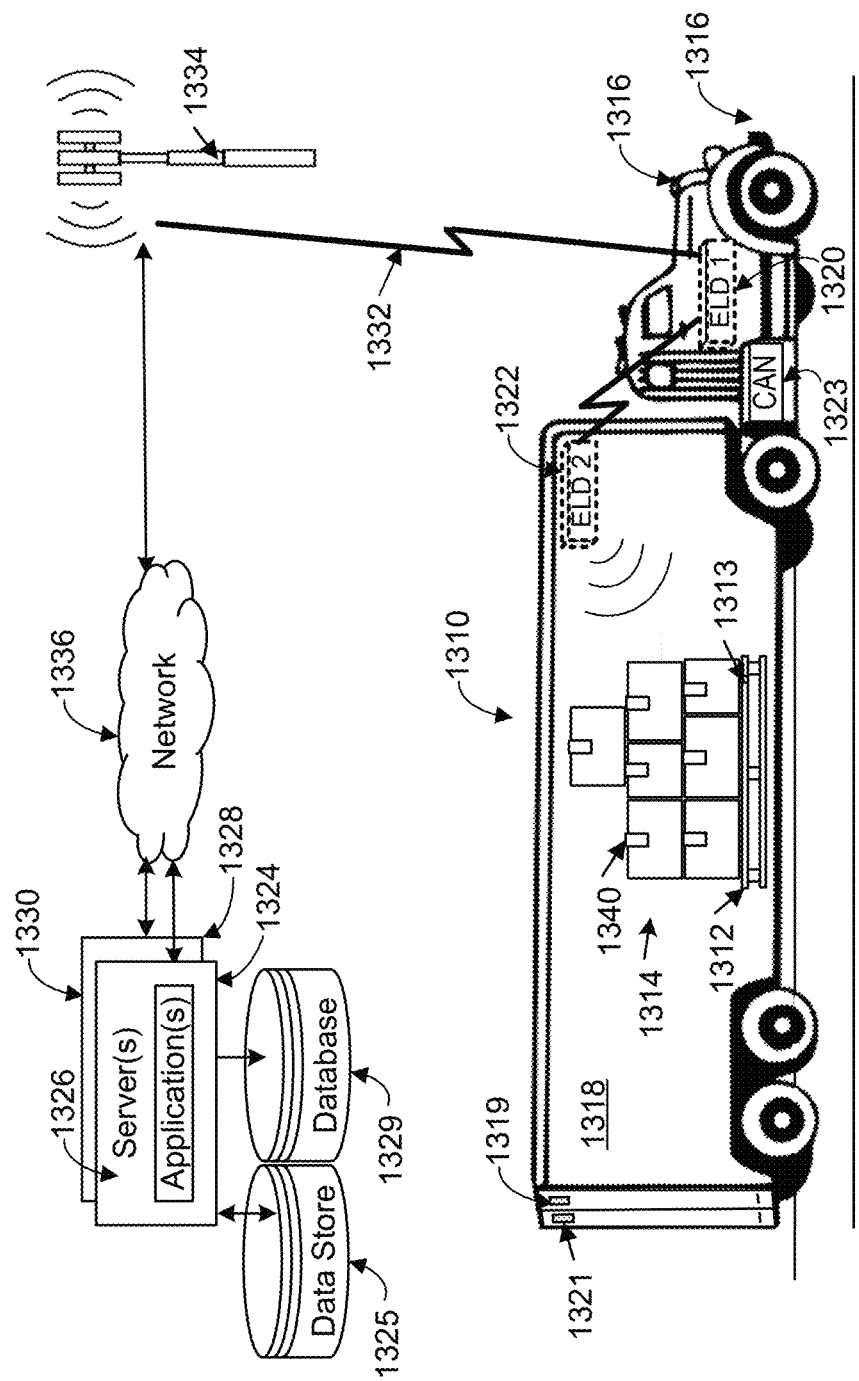
FIG. 13 is a schematic diagram a segment of an adhesive tape platform that communicates with one or more network services, during transportation, according to an embodiment.

FIG. 13 is a schematic diagram of an example vehicle 1310 (e.g., a semi-trailer truck) transporting a pallet 1312 of parcels 1314 containing goods or other things. In some embodiments, a tertiary wireless network node 1313 is fixed to the pallet 1312 and is configured to communicate wirelessly with the peripheral nodes 1340 that are attached to assets, and with the secondary electronic logging device 1322. In this example, the vehicle 1310 is a semi-trailer truck that includes a tractor unit 1316 and a semi-trailer 1318 that carries freight loaded through doors 1319 and 1321. In general, the vehicle 1310 may be any type of vehicle that can transport goods or other things from one place to another, including any type of motorcycle, car, truck, van, train, ship, or aircraft. In some embodiments, the peripheral nodes 1340 may be tracking adhesive products 274 or 294 (with reference to FIGS. 10A, B, respectively) or segment 13 (with reference to FIG. 1A, B), and may be tapped to the boxes containing assets and that are within the semi-trailer.

In the illustrated example, the tractor unit 1316 includes a primary electronic logging device 1320 (i.e., ELD 1, hereinafter may be referred to as primary ELD) and the semi-trailer 1318 includes a secondary electronic logging device 1322 (i.e., ELD 2, hereinafter may be referred to as secondary ELD). In some examples, the primary ELD 1320 and the secondary ELD 1322 each includes one or more of Cellular and GPS capability, wireless transceivers, processors, and memory devices storing programmatic instructions that enable wireless communications over multiple different wireless communications protocols and technologies across different power levels and ranges, such as, but not limited to, GSM, CDMA, Cellular, TDMA, WCDMA, EDGE, OFDM, GPRS, EV-DO, LTE, WiFi, LoRaWAN, Bluetooth LE, Z-wave, and Zigbee. The secondary ELD 1322 typically includes wireless communications interfaces that have lower power and shorter range than the communications interfaces in the primary ELD. The primary ELD 1320 and the secondary ELD 1322 have at least one communications interface (e.g., Bluetooth, LoRaWAN, and/or wired connection) in common so that they can communicate with one another.

In some embodiments, the primary ELD and the secondary ELD may be tracking adhesive products 274 or 294 (with reference to FIGS. 10A, B, respectively) or tape node segment 13 (with reference to FIG. 1A, B). Continuing this embodiment, the primary ELD and secondary ELD may have a higher storage capacity, battery, and processing power than the peripheral nodes 1340 attached to the assets. In some embodiments, the primary ELD and the secondary ELD may be mobile gateways (e.g., the mobile gateways 410, 412, with reference to FIG. 6).

In the illustrated example, the primary ELD 1320 ("ELD 1") wirelessly communicates with a server 1324 of a first network service 1326 and server 1328 of a second network service 1330 over respective cellular connections 1332 with a cell tower gateway 1334 and over a communications network 1336, which may be a private network or a public network (e.g., the Internet). Each of the network services 1326, 1330 includes respective ones of the network servers 1324, 1328 executing one or more applications and storing and retrieving data from respective data stores 1325, 1329. The network services 1326, 1330 may be, for example, a driver performance assessment service and a logistics management service.

In the illustrated example, the primary ELD 1320 in the tractor unit 1316 typically communicates with the first and second network services 1326, 1330 over one or more high-power, long-range communications interfaces. In addition, the primary ELD 1320 wirelessly communicates with the secondary ELD 1322 ("ELD 2") in the semi-trailer 1318 over a lower power, shorter-range wireless communications interface, such as LoRaWAN or Bluetooth LE. In some examples, the primary ELD 1320 also may communicate with the secondary ELD 1322 over a wired connection through a controller area network (CAN) bus system 1323, which is a vehicle bus standard designed to allow microcontrollers and devices to communicate with each other in applications using a message-based protocol without a host computer. The CAN bus system 1323 also may connect the primary ELD 1320 to the communications interface of a cellular modem that is installed in some embodiments of the tractor unit 1316 of the vehicle 1310, thereby enabling the primary ELD 1320 to share the cellular modem's existing cellular subscription service.

The parcels 1314 are associated with peripheral wireless network node devices that include wireless communications, processing, sensing, and data storage capabilities. In some examples, these peripheral wireless network node devices are implemented as wireless electronic tags that are carried in or otherwise attached to or integrated with the respective ones of the parcels 1314. Other examples incorporate the wireless communications, processing, sensing, and data storage capabilities into a low-cost, multi-function adhesive tape platform 100 with a form factor that unobtrusively integrates the components useful for implementing a combination of different logistic functions and also is able to perform a useful ancillary function that otherwise would have to be performed with the attendant need for additional materials, labor, and expense. In some examples, the primary ELD 1320 and the secondary ELD 1322 are implemented as one or more segments of respective types of the adhesive tape platform described in US Patent Application Publication No. US-2018-0165568-A1, which was published on Jun. 14, 2018, and is incorporated in its entirety herein.

In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly into various logistic applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of logistics management, including sealing parcels, transporting parcels, tracking parcels, monitoring the conditions of parcels, inventorying parcels, and verifying package security. In these examples, the sealed parcels typically are transported from one location to another by truck, train, ship, or aircraft or within premises, e.g., warehouses by forklift, trolleys etc.

Figure 14:
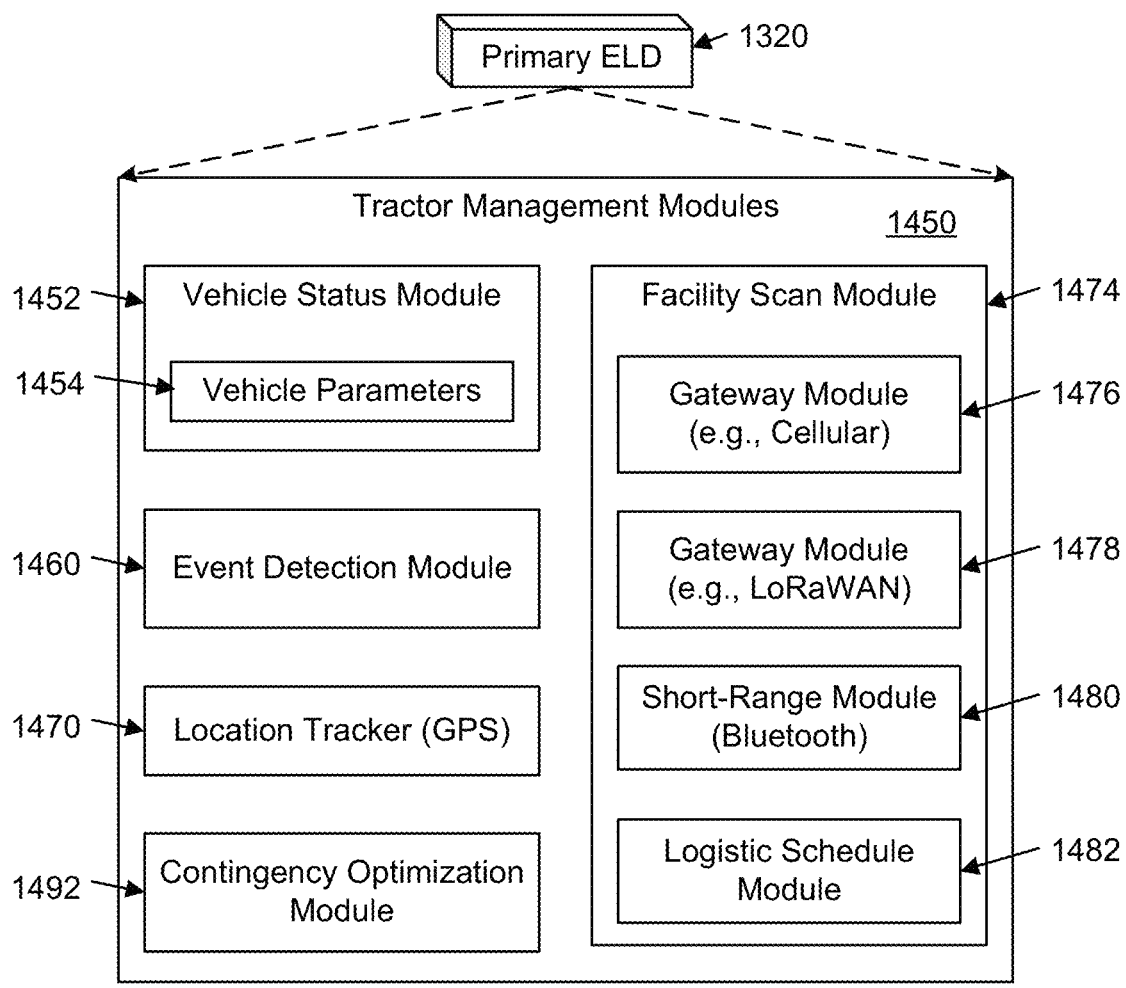
FIG. 14 is a block diagram of a set of example tractor management modules in an example of a primary electronic logging device (ELD), according to an embodiment.

FIG. 14 is a block diagram of a set of example tractor management modules in an example of a primary electronic logging device (ELD) 1320 (with reference to FIG. 13). The primary ELD 1320 includes a tractor management module 1450 that includes a vehicle status module 1452 and vehicle parameters 1454. Further, the primary ELD 1320 includes an event detection module 1460, a location tracker (GPS) 1470, and a contingency optimization module 1492. The primary ELD 1320 further includes a facility scan module 1474, that includes a gateway module (e.g., cellular) 1476, a gateway module (e.g., LoRaWAN) 1478, a short-range module (Bluetooth) 1480, and a logistic module 1482.

The vehicle status module 1452 may include the vehicle parameters 1454, that includes parameters of the vehicle, such as speed, background vibration from the engine or road, engine status, etc. The event detection module 1460 may collect data from the secondary ELD 1322 regarding detecting a tampering event, such as sensor data, such as vibration data, or any of the data discussed herein. The location tracker 1470 may track the location of the tractor 1316 (with reference to FIG. 13). The contingency module 1492 may include a list of contingency plans that correspond to particular tampering events. Each contingency plan may include indicia of certain sensor data that corresponding to a particular type of tampering. When the secondary ELD or the primary ELD receive sensor data, from the peripheral nodes 1340 about a tampering event, the sensor data may be categorized and then compared to corresponding sensor data for each contingency plan in the list of contingency plans. The contingency module 1492 may select a particular contingency plan is the received sensor data and the stored sensor data for a particular contingency plan satisfy a threshold. The contingency module 1492 may then execute the particular contingency plan to address the tampering event.

The facility scan module 1474 may be in wireless communication with the peripheral wireless network nodes 1340, collecting sensor data and scanning the trailer 1318 for indicia of a tampering event. The facility module 1474 may use gateway modules 1476, 1478, and short-range module 1480 to wirelessly communicate with the peripheral wireless network nodes 1340. The logistic schedule module 1482 may include a list of all assets and destinations for the assets, within the trailer 1318. The primary ELD 1320 may consult the logistic schedule module 1480, upon an occurrence of a tampering event, to determine that an asset should or shouldn't be tampered with. A further discussion of the set of example tractor management modules of the primary ELD 1320, shown in FIG. 14, will be included in the discussion of FIG. 15.

Figure 15:
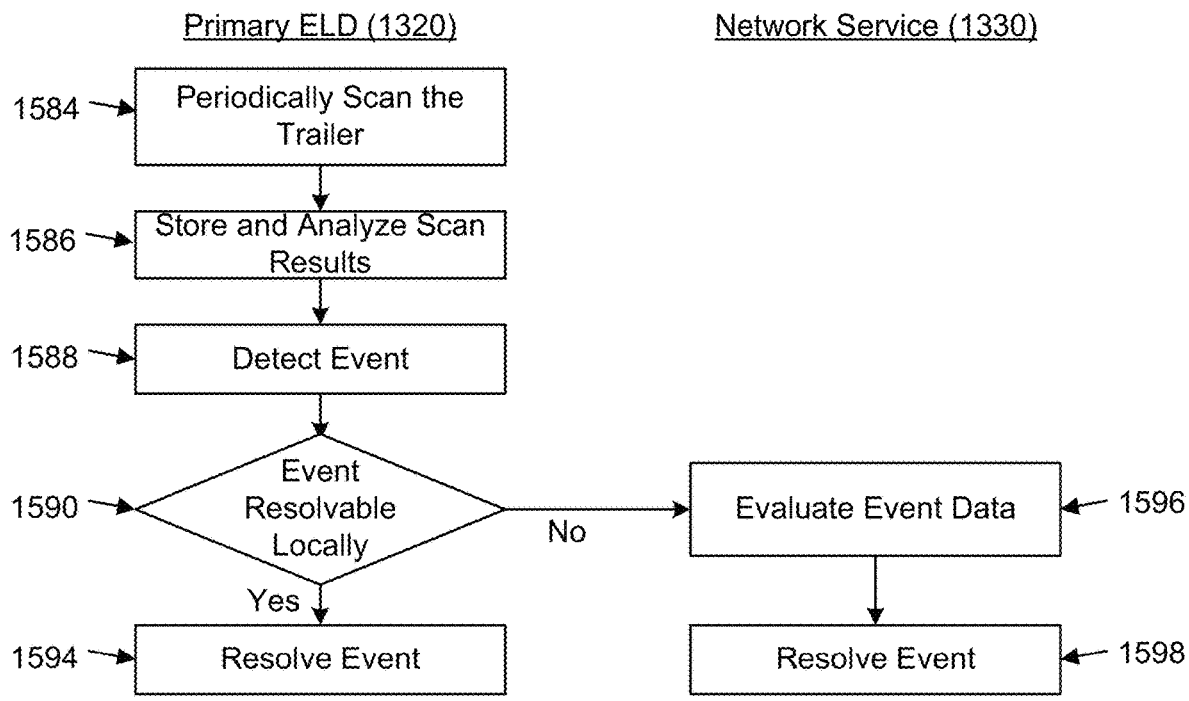
FIG. 15 is a flow diagram of an example method for responding to an events, that was detected by a node, associated with assets in a logistic facility, according to an embodiment.

FIG. 15 is a flow diagram of an example method for responding to a detection of a tampering event, by tape nodes, associated with assets in a logistic facility. FIGS. 14 and 15 are best viewed together with the following description. As shown in FIG. 15, after scanning (e.g., periodically) the trailer 1318 (block 1584), the primary ELD 1320 stores and analyzes the scan results (block 1586). The scan results may confirm that all the parcels listed in the logistic schedule module 1482 (FIG. 14) are in the trailer 1318. Alternatively, the scan results may reveal the occurrence of one or more predefined events relating to the parcels listed in the logistic schedule module 1482. For example, a "missing parcel" event occurs when a parcel listed in the logistic schedule module 1482 does not respond to a ping packet or is not in the trailer 1318. A "misrouted parcel" event occurs when a parcel is loaded on the wrong vehicle. An "unfit parcel" event occurs when a parcel listed in the logistic schedule module 1482 is damaged or otherwise unfit for delivery to the end customer. An "improper joinder" event occurs when a parcel is incorrectly designated as part of a group of parcels. An "improper removal" event occurs when a parcel is improperly removed from a designated group. The logistics management network service 1330 may define other events as needed.

Based on the analysis of the stored scan results and the event definitions, the primary ELD 1320 on the tractor unit 1316 of the vehicle 1310 determines whether any of the predetermined events have been detected (FIG. 15, block 1588).

For each event that has been detected, the primary ELD 1320 determines whether or not the event can be resolved locally, without the intervention of the logistics management network service 1330 (FIG. 15, block 1590). In some examples, the primary ELD 1320 accesses a contingency optimization module 1492 (shown in FIG. 14). In some examples, the contingency optimization module 1492 contains a set of programmatic instructions or rules for resolving events (i.e., a contingency plan) without the intervention of the logistics management network service 1330.

For example, in response to the detection of a "missing parcel" event, the primary ELD 1320 logs the event type and other details relating to the event in memory and, based on a mapping between the "missing parcel" event type and the instructions contained in the contingency optimization module 1492, the primary ELD 1320 executes the relevant instructions in the contingency optimization module 1492. In some cases, the primary ELD 1320 may be instructed to re-broadcast ping packets to the peripheral wireless network node associated with the non-responsive parcel using a different (e.g., higher) power level and/or a different communications protocol in an attempt to resolve the event (FIG. 15, block 1594).

In another example, in response to a "misrouted parcel" event, the primary ELD 1320 logs the event type and other details relating to the event in memory and, based on a mapping between the "missing parcel" event type and the instructions contained in the contingency optimization module 1592, the primary ELD 1320 executes the relevant instructions in the contingency optimization module 1492. In some cases, the primary ELD 1320 may be instructed to broadcast across the trailer 1318 ping packets that include the identifier of the peripheral wireless network node associated with the parcel of the same type that was misrouted in an attempt to resolve the event (FIG. 15, block 1594).

In another example, in response to the detection of an "unfit parcel" event resulting from exposure of a parcel to, for example, a temperature or an acceleration level greater than the respective threshold levels, the primary ELD 1320 executes the relevant instructions in the contingency optimization module 1492. Based on the current geographic location of the vehicle 1310, the location of the nearest replacement part, and the timing of the next scheduled delivery for the vehicle 1310, the contingency optimization module 1492 instructs primary ELD 1320 to broadcast to the trailer 1318 ping packets that include one or more identifiers of replacement parcels of the same type of the unfit parcel in an attempt to resolve the event (FIG. 15, block 1594). The primary ELD 1320 may also instruct the vehicle's driver interface system to display instructions to turn back to the last facility visited and obtain the replacement part instead of continuing directly to the next facility.

If the event is not resolvable locally (FIG. 15, block 1590), the primary ELD 1320 transmits the relevant data relating to the detected event to the logistics management network service 1330 over a long-range (e.g., cellular) communications interface. The logistics management network service 1330 evaluates the event data (FIG. 15, block 1596) and resolves the event (FIG. 15, block 1598). In some examples, the logistics management network service 1330 executes a logistics optimization program that takes into account the current locations and costs of vehicles, facilities, and package contents, road and traffic conditions, costs of late or failed delivery, and other factors to determine a global optimal solution for resolving the event.

For example, in response to a "improper joinder" event, the primary ELD 1320 logs the event type and other details relating to the event in memory and, based on a mapping between the "improper joinder" event type and the instructions contained in the contingency optimization module 1492, the primary ELD 1320 executes the relevant instructions in the contingency optimization module 1492. In some cases, the primary ELD 1320 may be instructed to log information retrieved from the improperly joined wireless tape node and report the improper inclusion of the identified wireless tape node to the logistics management network service 1330 in an attempt to resolve the event (FIG. 15, block 1594).

In another example, in response to a "improper removal" event, the primary ELD 1320 logs the event type and other details relating to the event in memory and, based on a mapping between the "improper removal" event type and the instructions contained in the contingency optimization module 1492, the primary ELD 1320 executes the relevant instructions in the contingency optimization module 1492. In some cases, the primary ELD 1320 may be instructed to log information retrieved from the improperly removed wireless tape node and parcel, and report the improper removal of the identified wireless tape node to the logistics management network service 1330 in an attempt to resolve the event (FIG. 15, block 1598). In some embodiments, the primary ELD will report to the improper removal to a client device (e.g., an authorized smart phone of a delivery driver).

Figure 16:
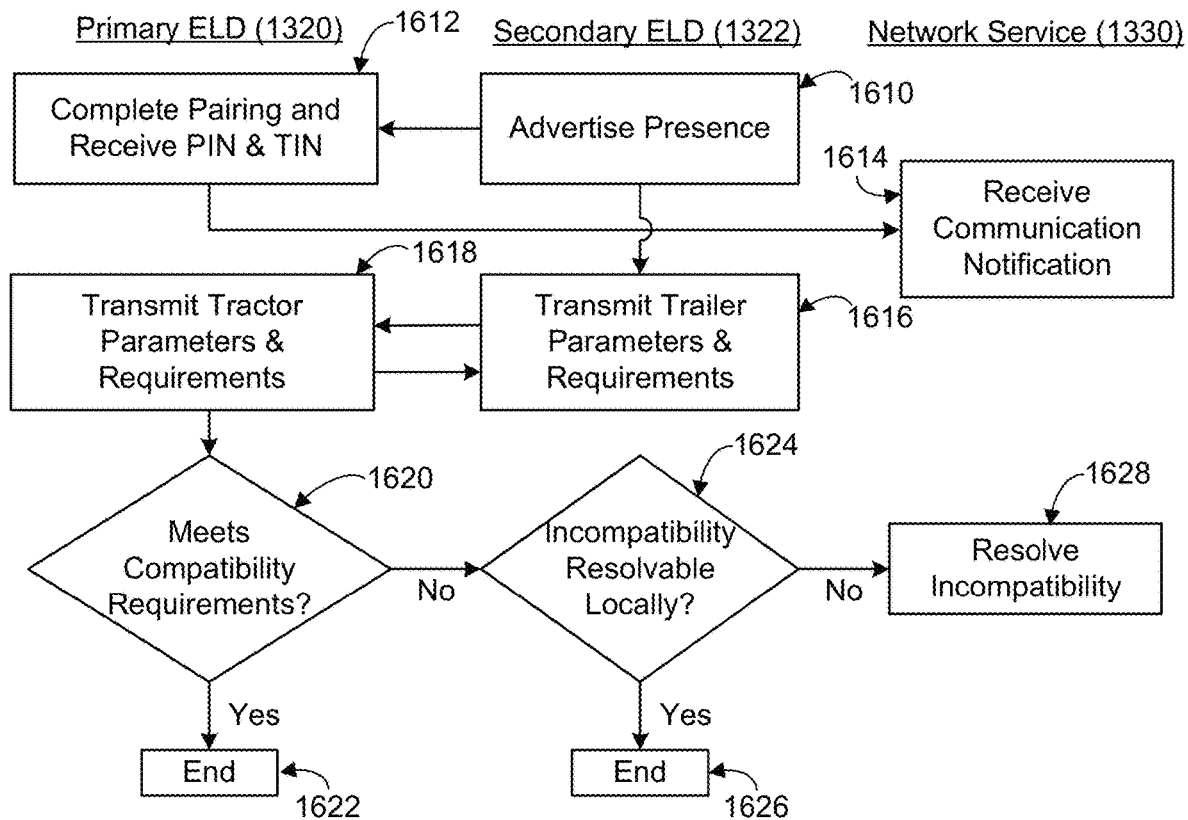
FIG. 16 is flow diagram of an example method for determining compatibility between a primary electric logging device and a secondary logging device that is in wireless communication with nodes, according to an embodiment.

Referring to FIG. 16, a processor of the secondary ELD 1322 executes the tractor compatibility module (not shown) to communicate with the primary ELD 1320 in the tractor unit 1316. In one example, to communicate with the primary ELD 1320, the secondary ELD 1322 advertises its presence with a specific authentication identifier and credentials (FIG. 16, block 1610). When the primary ELD 1320 receives data from the secondary ELD 1322, the primary ELD 1320 establishes a handshake with the secondary ELD 1322 on the corresponding advertisement channel (FIG. 16, block 1612). Then the primary ELD 1320 hands off communication with the secondary ELD 1322 to a data channel (e.g., a Bluetooth LE data channel). The primary ELD 1320 learns the secondary ELD's 1322 product identification number (PIN) and type identification number (TIN) of the secondary ELD 1322 (FIG. 16, block 1612) and transmits that information to the logistics management service 1330 to let it know that the primary ELD 1320 is communicating with the secondary ELD 1322 (FIG. 16, block 1614).

The secondary ELD 1320 executes the facility scan module 1474 and the logistic schedule module 1482 to perform wireless communications operations, including wirelessly identifying parcels and wirelessly determining the states of the parcels in the semi-trailer 1318. In some examples, the facility scan module 1474 communicates with peripheral wireless network nodes that are associated with the parcels in the semi-trailer 1318 over a short-range communications interface (e.g., Bluetooth LE).

In some embodiments, the secondary ELD 1322 transmits trailer parameters and requirements to the primary ELD 1320 (FIG. 16, block 1616). The trailer parameters and requirements may be transmitted, e.g., in response to a request made by the primary ELD 1320. In some embodiments, the primary ELD 1320 transmits tractor parameters and requirements to the secondary ELD 1322 (FIG. 6, block 1618). The trailer parameters and requirements may be transmitted from the primary ELD 1320 to the secondary ELD 1322, e.g., in response to a request made by the secondary ELD 1322.

As shown in FIG. 16, the primary ELD 1320 may determine whether the transmitted tractor parameters and requirements, as well as the transmitted trailer parameters and requirements, meet compatibility requirements (FIG. 16, decision block 1620). For example, the transmitted tractor and trailer parameters and requirements may be in the form of a numerical value or translated, by the primary ELD 1320, to the form of a numerical value. The primary ELD 1320 may then compare both the transmitted tractor and trailer parameters and requirements to a compatibility threshold. And, if the compared values of the parameters satisfy a predetermined threshold, the primary ELD 1320 may determine that the transmitted parameters and requirements meet compatibility requirements ("yes"), ending the inquiry.

However, if the primary ELD 1320 determines that the, e.g., compared values of the parameters do not satisfy the predetermined threshold, and the compatibility requirements are not met ("no"), the secondary ELD 1322 may determine if the incompatibility may be resolved locally, without the intervention of the logistics management network service 1330 (FIG. 13, decision block 1622). In some examples, the secondary ELD 1322 accesses the contingency optimization module 1492 (FIG. 14), which contains a set of programmatic instructions or rules for resolving events without the intervention of the logistics management network service 1330. If the secondary ELD 1322 determines that the incompatibility may be resolved locally ("yes"), the inquiry may end. However, if the secondary ELD 1322 determines that the incompatibility may not be resolved locally ("no"), the secondary ELD 1322 may notify the logistics management network service 30 to resolve the incompatibility (FIG. 16, block 1628).

Figure 17:
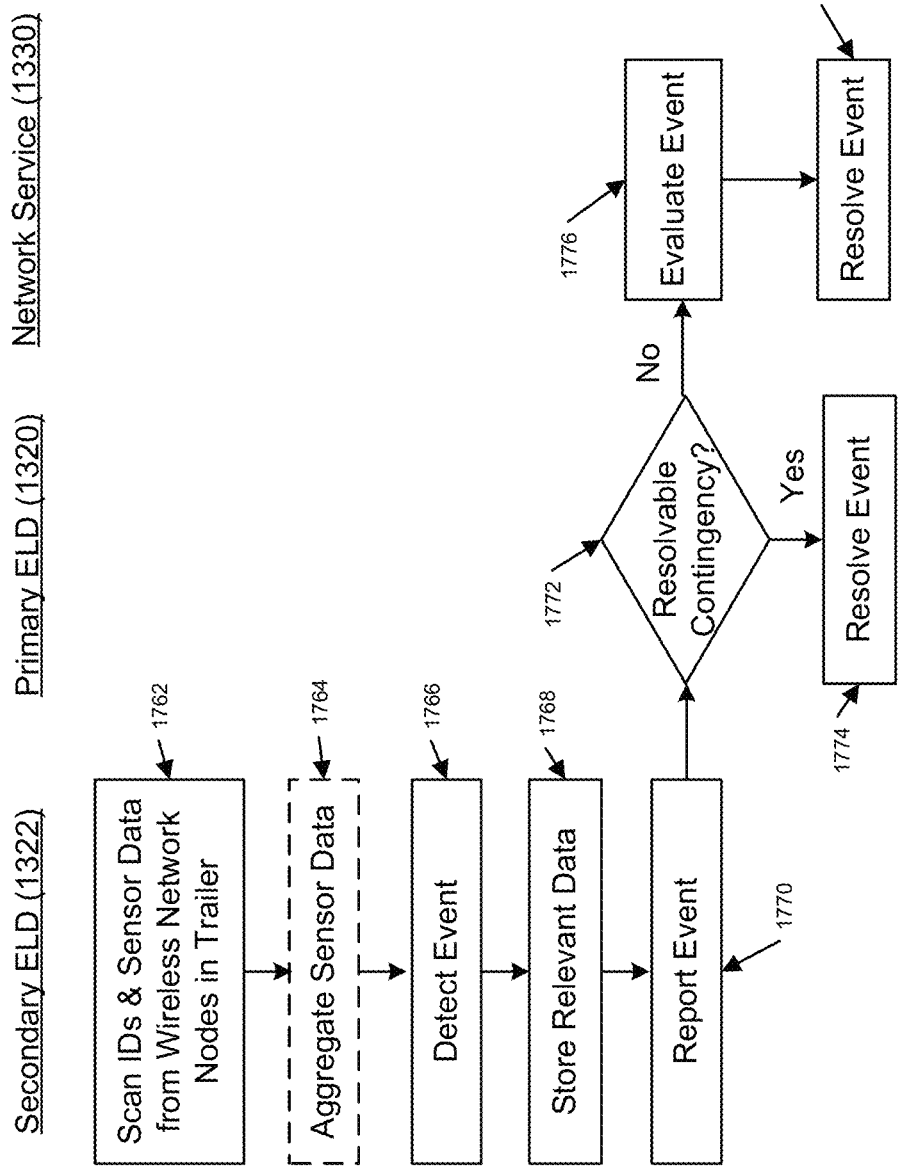
FIG. 17 is a schematic view of example method of resolving an event detected by the adhesive tape node and relayed to the secondary electronic device, according to an embodiment.

FIG. 17 shows an example method of detecting and responding to events involving assets in a trailer. The peripheral wireless network nodes (e.g., transducing circuit 70, as described with respect to FIG. 3) typically are associated with respective parcels in the semi-trailer 1318. In some examples, the logistics management network service 1330 programs the logistic schedule module 1482 with programmatic code that is executed by the secondary ELD 1322 in the semi-trailer 1318 to scan peripheral wireless network nodes according to a fixed and/or a dynamic schedule. For example, the scheduled scan times may be one or a combination of irregular scan intervals, regular (e.g., periodic) intervals, and ad hoc intervals triggered, for example, by detected events.

In some examples, the secondary ELD 1322 executes the facility scan module 1474 to read the IDs of the peripheral wireless network nodes in the semi-trailer 1318 and also collect sensor data stored in the memories 96 of the peripheral wireless network nodes (e.g., the wireless transducing circuit 70, as described with respect to FIG. 3) in the semi-trailer 1318 (FIG. 17, block 1762). In some examples, the secondary ELD 1322 aggregates the collected sensor data by data type (FIG. 17, block 1764).

After scanning the semi-trailer 1318, the secondary ELD 1322 stores and analyzes the scan results to detect events (FIG. 17, block 1766). Based on the analysis of the scan results and the event definitions, the secondary ELD processor in the semi-trailer 1318 of the vehicle 1310 determines whether any events have been detected. The scan results may confirm, for example, that all the parcels listed in the logistic schedule module 1482 are in the semi-trailer 1318. Alternatively, the scan results may reveal that one or more predefined events relating to the parcels occurred. For example, a "missing parcel" event occurs when a parcel listed in the logistic schedule module 1482 does not respond to a ping packet broadcasted by the secondary ELD 1322 or when such a parcel is not in the semi-trailer 1318. An "unfit parcel" event occurs, for example, when a parcel listed in the logistic schedule module 1482 is damaged or otherwise unfit for delivery to the end customer. For example, when a temperature sensor in a peripheral wireless network node associated with a parcel registers one or more temperature readings that exceed or fall below a specified threshold temperature over a specified period of time, the contents of that parcel will be designated as being unfit for delivery. Similarly, when an acceleration or shock sensor in a peripheral wireless network node (e.g., the wireless transducing circuit 70, as described with respect to FIG. 3) associated with a parcel registers one or more acceleration or shock levels that exceed the specified threshold acceleration or shock levels over a specified period of time, the contents of that parcel will be designated as being unfit for delivery. The logistics management network service 1330 may define other semi-trailer events as needed.

For each detected event (FIG. 17, block 1766), the secondary ELD 1322 stores the relevant data in memory (FIG. 17, block 1768) and reports the event to the primary ELD 1320 in the tractor unit 1316 (FIG. 17, block 1770). For each event that has been detected, the primary ELD 1320 determines whether or not the event can be resolved locally, without the intervention of the logistics management network service 1330 (FIG. 17, block 1772). In some examples, the primary ELD 1320 accesses the contingency optimization module 1492 (FIG. 14), which contains a set of programmatic instructions or rules for resolving events without the intervention of the logistics management network service 1330.

For example, in response to the detection of a "missing parcel" event, the primary ELD 1320 in the tractor unit 1316 logs the event type and other details relating to the event in memory and, based on a mapping between the "missing parcel" event type and the instructions contained in the contingency optimization module 1492, the primary ELD 1320 executes the relevant instructions in the contingency optimization module 1492. In some cases, the primary ELD 1320 may be instructed by the contingency optimization module 1492 to re-broadcast ping packets to the peripheral wireless network node associated with the non-responsive parcel using a different (e.g., higher) power level and/or a different communications protocol in an attempt to resolve the event (FIG. 17, block 1774).

In another example, in response to the detection of an "unfit parcel" event resulting from exposure to a temperature or an acceleration level greater than the respective threshold levels for these parameters, the primary ELD 1320 executes the relevant instructions in the contingency optimization module 1492. Based on the current geographic location of the vehicle 1310, the location of the nearest replacement part, and the timing of the next scheduled delivery for the vehicle 1310, the primary ELD 1320 may be instructed to broadcast to the facility ping packets that include one or more identifiers associated with replacement parcels of the same type of the unfit parcel in an attempt to resolve the event (FIG. 17, block 1774). In another example, the primary ELD 1320 may instruct the vehicle's driver interface system to display instructions to turn back to the last facility visited and obtain the replacement items instead of directly continuing on to the next facility on the scheduled route.

If the event is not resolvable locally (FIG. 17, block 1772), the primary ELD 1320 transmits the relevant data relating to the detected event to the logistics management network service 1330 over a long-range (e.g., cellular) communications interface. The logistics management network service 1330 evaluates the event data (FIG. 17, block 1776) and resolves the event (FIG. 17, block 1778). In some examples, the logistics management network service 1330 executes a logistics optimization program that takes into account the current locations of vehicles and facilities, their respective contents, road and traffic conditions, and other resources to determine a global optimal solution for resolving the event.

Figure 18:
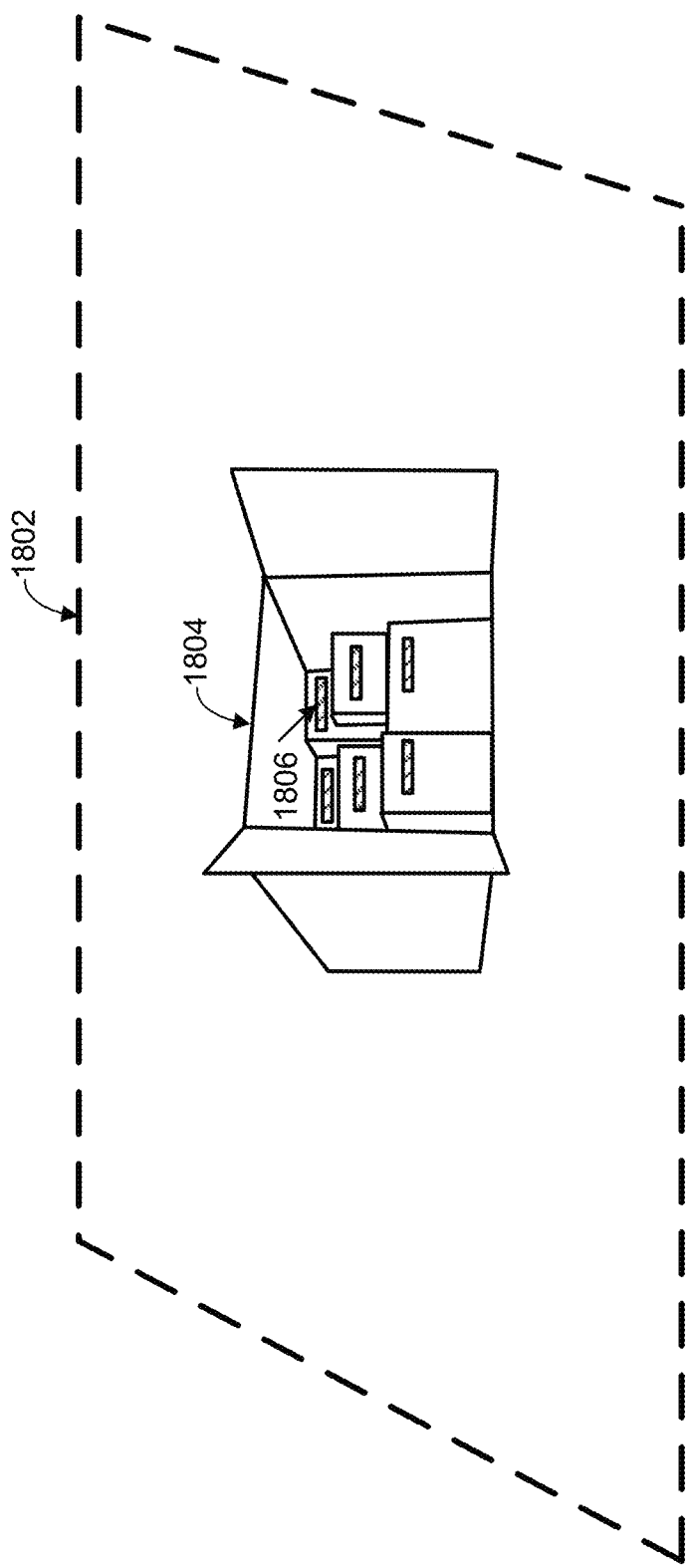
FIG. 18 is an example of a safe zone where the adhesive tape node may determine to lower some functionality to save battery life, according to an embodiment.

FIG. 18 shows an example safe zone 1802 (e.g., an authorized area), where a container 1804 and one or more tape nodes 1806, attached to packages, within the container 1804. The tape nodes 1806 may determine they are located within the safe zone 1802 and reduce battery consumption by, e.g., disabling some functionality of the tape nodes 1806. The tape nodes 1806 may disable their functionality because there may not be a need to actively collet sensor data and check for tampering because the tape nodes 1806 are located within a safe zone. For example, the tape node 1806 may temporarily, or at least until a time when the tape nodes are moved outside the safe zone 1802, stop collecting sensor data. In some embodiments, the disabling of functionality may be due to privacy concerns of an owner of the safe zone not wanting the sensors collecting private or confidential information.

In some embodiments, the safe-zone 1802 may be a geo-fenced area that is determined according to map data of a specific area. Each of the tape nodes 1806, master node (e.g., master node 424), or the server (e.g., server 404) may have preprogrammed instructions that include a perimeter outlining a safe-zone that defines the geo-fenced area. Upon entering the geo-fenced area, the tape nodes 1806 or master node (e.g., master node 424), e.g., may reference the map data against a current location of the tape nodes 1806 or master node (e.g., master node 424), and then disable some functionality while within the geo-fenced area. In some embodiments, the server (e.g., server 404) may determine, based on collecting the location data of the tape nodes 1806, that the tape nodes 1806 are within the geo-fenced area by referencing the map data against the location data. In this embodiment, the server may instruct the tape nodes 1806 to disable some functionality until the server determines that the tape nodes 1806 have left the geo-fenced area.

In some embodiments, the tape nodes may disable some functionality in response to a safe time, that may be based on referencing a schedule log stored locally on any of the tape nodes 1806 or master node (e.g., master node 424). For example, the schedule log may list that the container 1804 (or an asset) is scheduled to arrive at a location on a first date and may enter a checkpoint, in route to the location, on a second date for a duration of time. The check point may be a secured area. The tape nodes 1806 or master node (e.g., master node 424) may reference the schedule log and determine that a current time is within the duration of time for the second date, and, in response, disable some functionality until the end of the time duration. In some embodiments, the server (e.g., server 404) may have a copy of the schedule log stored in a database (e.g., database 408) and may reference a current time against the schedule log. The server may determine that the current time is within the duration of time of the second date and may instruct the tape nodes 1806 or master node (e.g., master node 424) to disable some functionality until expiration of the time duration.

Figure 19:
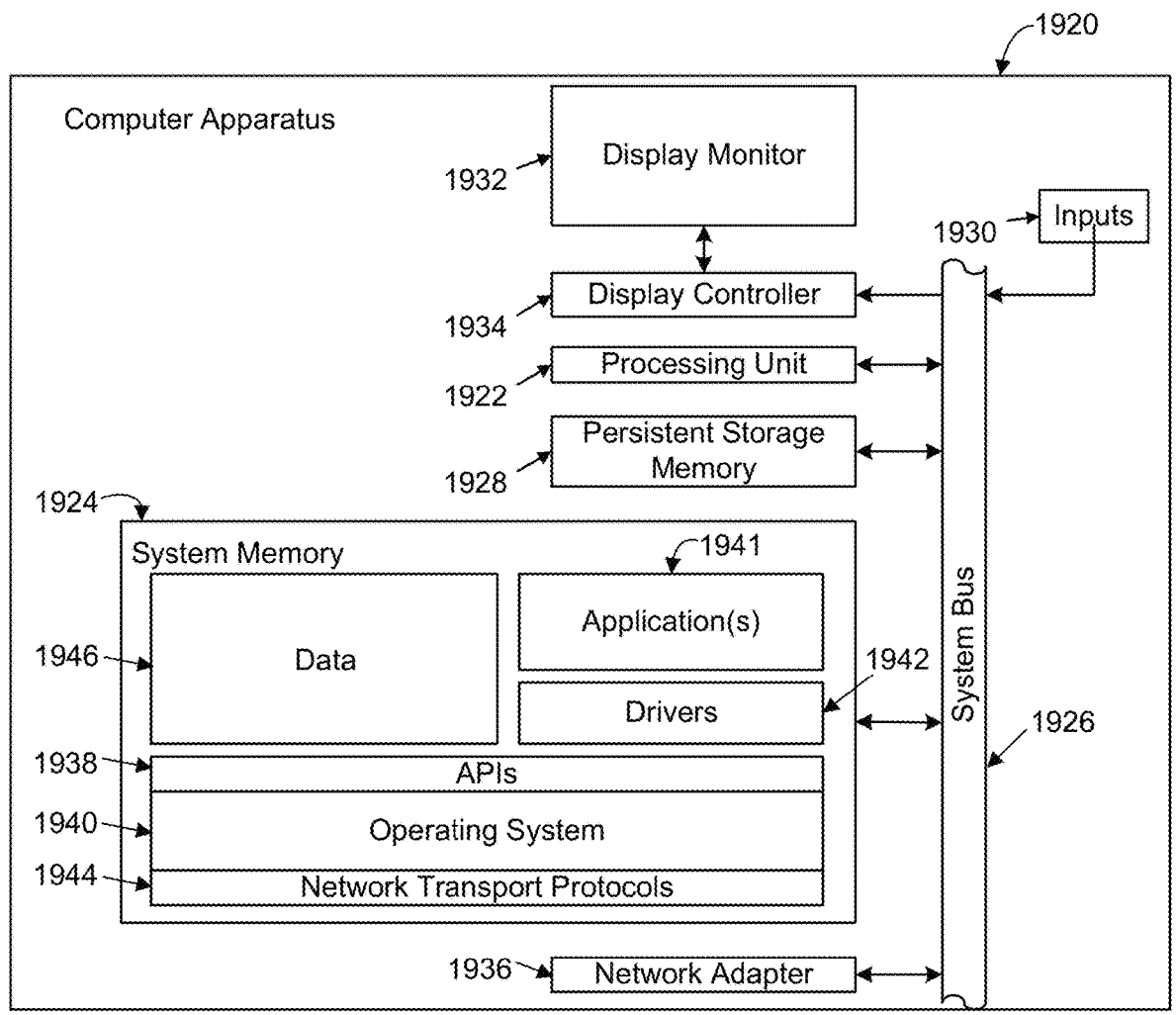
FIG. 19 is a block diagram of an example computer apparatus, according to an embodiment.

FIG. 19 shows an example embodiment of computer apparatus 1920 that, either alone or in combination with one or more other computing apparatus, is operable to implement one or more of the computer systems described in this specification.

The computer apparatus 1920 includes a processing unit 1922, a system memory 1924, and a system bus 1926 that couples the processing unit 1922 to the various components of the computer apparatus 1920. The processing unit 1922 may include one or more data processors, each of which may be in the form of any one of various commercially available computer processors. The system memory 1924 includes one or more computer-readable media that typically are associated with a software application addressing space that defines the addresses that are available to software applications. The system memory 1924 may include a read only memory (ROM) that stores a basic input/output system (BIOS) that contains start-up routines for the computer apparatus 1920, and a random-access memory (RAM). The system bus 1926 may be a memory bus, a peripheral bus, or a local bus, and may be compatible with any of a variety of bus protocols, including PCI, VESA, Microchannel, ISA, and EISA. The computer apparatus 1920 also includes a persistent storage memory 1928 (e.g., a hard drive, a floppy drive, a CD ROM drive, magnetic tape drives, flash memory devices, and digital video disks) that is connected to the system bus 1926 and contains one or more computer-readable media disks that provide non-volatile or persistent storage for data, data structures and computer-executable instructions.

A user may interact (e.g., input commands or data) with the computer apparatus 1920 using one or more input devices 1930 (e.g. one or more keyboards, computer mice, microphones, cameras, joysticks, physical motion sensors, and touch pads). Information may be presented through a graphical user interface (GUI) that is presented to the user on a display monitor 1932, which is controlled by a display controller 1934. The computer apparatus 1920 also may include other input/output hardware (e.g., peripheral output devices, such as speakers and a printer). The computer apparatus 1920 connects to other network nodes through a network adapter 1936 (also referred to as a "network interface card" or NIC).

A number of program modules may be stored in the system memory 1924, including application programming interfaces 1938 (APIs), an operating system (OS) 1940 (e.g., the Windows® operating system available from Microsoft Corporation of Redmond, Wash. U.S.A.), software applications 1941 including one or more software applications programming the computer apparatus 1920 to perform one or more of the steps, tasks, operations, or processes of the positioning and/or tracking systems described herein, drivers 1942 (e.g., a GUI driver), network transport protocols 1944, and data 1946 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

The following embodiments are specifically contemplated, as well as any combinations of such embodiments that are compatible with one another:

(A1) A method for a wireless sensing system that receives sensor data from a sensor associated with an asset. The sensor data represents a tampering event of the asset. The wireless sensing system determines whether the tampering event was authorized. The wireless sensing system determines whether the tampering event occurred at an authorized area. In response to one or both of: (1) the tampering event being unauthorized, and (2) the tampering event being performed within an unauthorized area, the wireless sensing system transmits a notification of the tampering event to a mobile device wirelessly connected to the wireless sensing system.

(A2) In the embodiment denoted by (A1), the tampering event occurs within an area of a storage container.

(A3) In either of the embodiment denoted by (A1) or (A2), the wireless sensing system determines whether the tampering event is authorized. A node of the wireless sensing system attached to the asset communicates with a plurality of nodes attached to corresponding asset of a plurality of assets, the plurality of nodes tracking the plurality of assets. The node of the wireless sensing system receives inventory of the plurality of nodes. The node of the wireless sensing system transmits an alert to other nodes attached to other assets in the proximity of the asset. The alert causes the other nodes to set a flag indicative of the tampering each of the plurality of nodes. The alert is a notification that a tampering event may have occurred and includes an instruction for each of the plurality of nodes to store the alert as a flag.

(A4) In any of the embodiments denoted by (A1) through (A3), the stored alert, within each of the plurality of nodes, is scannable by a user device.

(A5) In any of the embodiments denoted by (A1) through (A4), the wireless sensing system determines whether the tampering event is authorized by communicating, by a node of the wireless sensing system, the node attached to the asset, with a user device associated with an authorized user. The node of the wireless sensing system receives an authorization key of the user device.

(A6) In any of the embodiments denoted by (A1) through (A5), the received sensor data for the tampering event is logged to a historical record of tampering records, each logged tampering event includes a set of corresponding sensor data.

(A7) In the embodiments denoted by (A1) through (A6), the user device is a smart phone, and the node of the wireless sensing system determines that the tampering event is authorized in response to receiving the authorization key of the user device.

(A8) In the embodiments denoted by (A1) through (A7), the user device is a badge that includes an RFID chip, the method further comprising: determining that the tampering event is authorized in response to receiving, by the node of the wireless sensing system, the authorization key of the user device.

(A9) In any of the embodiments denoted by (A3) through (A8), the node of the wireless sensing system receives from the user device, a wireless signal that sets a period of time that a tampering event shall not trigger the wireless sensing system.

(A10) In any of the embodiments denoted by (A1) through (A9), the wireless sensing system determines whether the tampering event occurred within an authorized area. The wireless sensing system receives, from a local node of the wireless sensing system that is attached to the asset, a current location of the asset. The wireless sensing system determines whether the current location of the asset is within the authorized area.

(A11) In any of the embodiments denoted by (A10), the local node of the wireless sensing system determines the current location of the asset is within the authorized area. The local node disables some functionality of the local node to save battery life of the node.

(A12) In any of the embodiments denoted by (A1) through (A11), the sensor data includes one or more of: vibration data, optical data, acoustic data, temperature data, orientation data, pressure data, altitude data, biometric data, humidity data, radioactivity data, and chemical data.

(A13) In any of the embodiments denoted by (A1) through (A12), the sensor includes a capacitive sensor, an altimeter, a gyroscope, an accelerometer, a temperature sensor, a strain sensor, a pressure sensor, a piezoelectric sensor, a weight sensor, an optical sensor, an acoustic sensor, a smoke detector, a radioactivity sensor, a chemical sensor, a biosensor, a magnetic sensor, an electromagnetic field sensor, and a humidity sensor.

(A14) In any of the embodiments denoted by (A1) through (A13), a wireless node of the wireless sensing system is attached to the asset. The receiving sensor data, the determining whether the tampering event was authorized, the determining whether the tampering event occurred at an authorized area, and the transmitting the notification of the tampering event to a device registered with the wireless sensing system, are all performed by the wireless node of the wireless sensing system.

(A15) In any of the embodiments denoted by (A1) through (A14), In some aspects, a server is associated with the wireless sensing system, and the receiving sensor data, the determining whether the tampering event was authorized, the determining whether the tampering event occurred at an authorized area, and the transmitting the notification of the tampering event to a device registered with the wireless sensing system, are all performed by a server of the wireless sensing system.

(B1) A wireless sensing system is associated with a wireless sensing system that has a network of wireless nodes, that includes at least one processor and one memory communicatively coupled with the at least one processor, and stores machine-readable instructions that, when executed by the processor, cause the processor to receive a signal from a recently-activated wireless node of the network of wireless nodes. The processor further adds an identifier of the recently-activated tape node to indicate that the recently-activated wireless node has joined the network of wireless nodes to a database, according to a classification of the tape node.

(B2) In any of the embodiments denoted by (B1), the wireless sensing receive, via the wireless sensing system, sensor data from a sensor associated with an asset, the sensor data representing a tampering event of the asset; determine whether the tampering event was authorized; determine whether the tampering event occurred within an authorized area; and in response to one or both of: (1) the tampering event is unauthorized, and (2) the tampering event is not performed within the authorized area, transmit a notification indicating the tampering event to a mobile device wirelessly connected to the wireless sensing system in response to one or both of: (1) the tampering event is unauthorized, and (2) the tampering event is not performed within the authorized area, transmit a notification indicating the tampering event to a mobile device wirelessly connected to the wireless sensing system.

(B3) In any of the embodiments denoted by (B1) through (B2), where the memory storing further machine-readable instructions that, when executed by the processor, further cause the processor to receive, via the wireless sensing system, sensor data from a sensor associated with an asset, the sensor data representing a tampering event of the asset. Determine whether the tampering event was authorized. Determine whether the tampering event occurred within an authorized area. In response to one or both of: (1) the tampering event is unauthorized, and (2) the tampering event is not performed within the authorized area, transmit a notification indicating the tampering event to a mobile device wirelessly connected to the wireless sensing system.

(B4) In any of the embodiments denoted by (B2) through (B3), the sensor includes a capacitive sensor, an altimeter, a gyroscope, an accelerometer, a temperature sensor, a strain sensor, a pressure sensor, a piezoelectric sensor, a weight sensor, an optical sensor, an acoustic sensor, a smoke detector, a radioactivity sensor, a chemical sensor, a biosensor, a magnetic sensor, an electromagnetic field sensor, and a humidity sensor.

(B5) In any of the embodiments denoted by (B2) through (B4), the sensor data includes one or more of: vibration data, optical data, acoustic data, temperature data, orientation data, pressure data, altitude data, biometric data, humidity data, radioactivity data, and chemical data.

(B6) In any of the embodiments denoted by (B1) through (B5), wherein determining whether the tampering event was authorized comprises further machine-readable instructions that, when executed by the processor, cause the processor to cause the node of the wireless sensing system to communicate with the node attached to the asset, with a user device associated with an authorized user. The node of the wireless sensing system receives an authorization key of the user device.

(B7) In any of the embodiments denoted by (B1) through (B6), the wireless sensing system determining whether the tampering event occurred within an authorized area includes the wireless sensing system and from a local node attached to the asset receiving a current location of the asset. The wireless sensing system determines whether the current location of the asset is within the authorized area.

(B8) In any of the embodiments denoted by (B1) through (B7), the receiving, the determining, and the transmitting are performed by a wireless node of the wireless sensing system. The memory storing further machine-readable instructions that, when executed by the processor, further causes the processor to store, by the wireless sensing system, information describing the tampering event.

(B9) In any of the embodiments denoted by (B1) through (B8), A wireless node of the network of wireless nodes is attached to the asset. The receiving sensor data, the determining whether the tampering event was authorized, the determining whether the tampering event occurred at an authorized area, and the transmitting the notification of the tampering event to a device registered with the wireless sensing system, are all performed by the wireless node.

(B10) In any of the embodiments denoted by (B1) through (B9), a classification defines a communication capability of the recently-activated tape node. The classification defines the communication capability of the one of a plurality of classifications each defining different communication capabilities of a wireless communication interface of each of the wireless nodes in the network of wireless nodes.

(C1) A method for operating a wireless sensing system that includes a first tape node attached to a first parcel. The first tape node has a first type of wireless communication interface and a second type of wireless communication interface that has a longer range than the first type of wireless communication interface. A second tape node is capable of communicating with the first tape node. A server establishes a wireless communication connection with the second type of wireless communication interface of the first tape node. The server designates the first tape node as a master node of the second tape node.

(C2) In any of the embodiments denoted by (C1), the wireless sensing system further includes a third tape node operable to communicate with the first tape node and the second tape node. A hierarchical structure for a communications network is created and includes at least the first, second, and third nodes which are defined by one or more factors. The first, second, and third nodes are assigned to various levels of the communications network based on a classification for each of the first, second, and third nodes, according to the one or more factors.

(C3) In any of the embodiments denoted by (C1) through (C2), creating the hierarchical structure of the communications network further includes utilizing one or more of a neural network, artificial intelligence method, and a machine learning computing systems.

(C4) In any of the embodiments denoted by (C1) through (C3), the second and third tape nodes are each attached to opposing doors of a storage container. One of the second and third tape nodes measures a change in distance between the second and third tape nodes. One of the second and third tape nodes transmits an alert that a tampering event is occurring, in response to the change in distance between the second and third tape nodes satisfying a threshold.

(C5) In any of the embodiments denoted by (C1) through (C4), the wireless sensing system further includes one or more sensors. The one or more sensors include a vibration sensor for detecting tampering that causes an increase of vibration compared to background vibration levels.

(D1) A wireless sensing system that has a primary electronic logging device (ELD) and a secondary ELD. The secondary ELD includes at least one processor and a memory communicatively coupled with the at least one processor and stores machine-readable instructions that, when executed by the processor, cause the processor to receive tape node data from a tape node associated with an asset proximate to the secondary ELD, the tape node data representing a tampering event performed on the asset. The processor compares the tape node data to a list of predetermined events, stored within the memory. The list of predetermined events includes one or more predetermined events and corresponding elements of tape node data associated with each of the one or more predetermined events. The processor determines, based on the comparison, that the tampering event does not match a predetermined event within the list of predetermined events. The processor executes, in response to the determination that the tampering event does not match a predetermined event, a particular contingency plan, based on the tampering event.

(D2) In any of the embodiments denoted by (D1), the memory further causes the secondary ELD to determine whether the tampering event can be resolved locally.

(D3) In any of the embodiments denoted by (D1) through (D2), the memory further causes the processor to retrieve, from a plurality of wireless nodes associated with the asset, data relating to the tampering event when the tampering event is not a predetermined event. The memory further causes the processor to broadcast data, according to the particular contingency plan, to the plurality of wireless nodes associated with the asset. The memory further causes the processor to transmit a notification, to the primary ELD of the wireless sensing system, to notify a management system of the wireless sensing system, the notification alerting the management system of the wireless sensing system that the tampering event has occurred.

(D4) In any of the embodiments denoted by (D1) through (D3), the wireless sensing system transmits the notification alerting an authorized user of the client device, to the client device.

(D5) In any of the embodiments denoted by (D1) through (D4), where the memory further causes the processor to transmit a request for assistance from the primary ELD.

(D6) In any of the embodiments denoted by (D1) through (D5), where the tampering event may be one of an improper asset, unfit asset, missing asset, and misrouted asset.

(D7) In any of the embodiments denoted by (D1) through (D6), where the primary ELD is proximate to the secondary ELD, both of which are within a same vehicle.

(D8) In any of the embodiments denoted by (D1) through (D7), where executing the contingency plan further includes the processor causing the secondary ELD to identify the contingency plan as a particular contingency plan, from a set of contingency plans, satisfying a threshold. Then compare the tampering event to a set of contingency plans stored in the memory. Then determine, based on the comparison of the tampering event with the contingency plan satisfying a threshold, a particular contingency plan. Then execute instructions contained within the particular contingency plan.

(D9) In any of the embodiments denoted by (D1) through (D8), where the wireless sensing system further includes a peripheral wireless network node that is associated with a missing asset. The missing asset is wirelessly connected to the secondary ELD and proximate to the asset. The tampering event is a missing asset, and the particular contingency plan includes instructions for wireless sensing system to re-broadcast ping packets to the peripheral wireless network node associated with the missing asset using a different communications protocol.

(D10) In any of the embodiments denoted by (D1) through (D9), where the tampering event cannot be resolved locally. The memory includes further computer-readable instructions that, when executed by the processor, further cause the secondary ELD to send the primary ELD a request for an outside contingency plan.

(D11) In any of the embodiments denoted by (D1) through (D10), where the primary ELD is the tape node designed to wirelessly communicate using Bluetooth, LoRa, Cellular, and GPS.

(D12) In any of the embodiments denoted by (D1) through (D11), where the primary ELD is another tape node than the tape node and the primary ELD has increased storage capacity, battery, and processing power than the tape node.

(D13) In any of the embodiments denoted by (D1) through (D12), where the tampering event occurred on a storage container.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method comprising:
receiving, by a wireless sensing system, sensor data from a sensor associated with an asset, the sensor data representing a tampering event of the asset, wherein the tampering event represents one or both of (1) a distance between a first tape node and a second tape node increasing past a threshold distance, and (2) a tear being detected in circuitry of a single tape node;
determining, by the wireless sensing system, whether the tampering event was authorized;
determining, by the wireless sensing system, whether the tampering event occurred at an authorized area; and
in response to one or both of: (1) the tampering event being unauthorized, and (2) the tampering event being performed within an unauthorized area, transmitting a notification of the tampering event to a mobile device wirelessly connected to the wireless sensing system.

2. The method of claim 1, wherein the tampering event occurred within an area of a storage container.

3. The method of claim 1, wherein determining, by the wireless sensing system, whether the tampering event is authorized comprises:
communicating, by a node of the wireless sensing system, the node attached to the asset, with a plurality of nodes each attached to a corresponding asset of a plurality of assets, the plurality of nodes tracking the plurality of assets;
receiving, by the node of the wireless sensing system, inventory of the plurality of nodes; and
transmitting, by the node of the wireless sensing system, an alert to other nodes attached to other assets in proximity of the asset, wherein the alert causes the other nodes to set a flag, indicative of the tampering event, at each of the plurality of nodes, the alert is a notification that a tampering event may have occurred.

4. The method of claim 3, wherein the flag, within each of the plurality of nodes, is scannable by a user device.

5. The method of claim 1, wherein determining, by the wireless sensing system, whether the tampering event is authorized comprises:
communicating, by a node of the wireless sensing system, the node attached to the asset, with a user device associated with an authorized user; and
receiving, by the node of the wireless sensing system, an authorization key of the user device.

6. The method of claim 5, further comprising logging the received sensor data for the tampering event to a historical record of tampering records, each logged tampering event includes a set of corresponding sensor data.

7. The method of claim 5, wherein the user device is a smart phone, the method further comprising:
determining that the tampering event is authorized in response to receiving, by the node of the wireless sensing system, the authorization key of the user device.

8. The method of claim 5, wherein the user device is a badge that includes an RFID chip, the method further comprising:
determining that the tampering event is authorized in response to receiving, by the node of the wireless sensing system, the authorization key of the user device.

9. The method of claim 5, further comprising:
receiving, by the node of the wireless sensing system, from the user device, a wireless signal that sets a period of time that a tampering event shall not trigger the wireless sensing system.

10. The method of claim 1, wherein determining, by the wireless sensing system, whether the tampering event occurred within an authorized area comprises:
receiving, from a local node of the wireless sensing system that is attached to the asset, a current location of the asset; and
determining whether the current location of the asset is within the authorized area.

11. The method of claim 10, wherein the local node of the wireless sensing system determines the current location of the asset is within the authorized area, the method further comprising:
 disabling, by the local node, some functionality of the local node to save battery life of the local node.

12. The method of claim 1, wherein a server is associated with the wireless sensing system, and wherein the receiving sensor data, the determining whether the tampering event was authorized, the determining whether the tampering event occurred at an authorized area, and the transmitting the notification of the tampering event to a device registered with the wireless sensing system, are all performed by a server of the wireless sensing system.

13. A wireless sensing system having a network of wireless nodes, comprising,
 at least one processor; and
 non-transitory memory communicatively coupled with the at least one processor and storing machine-readable instructions that, when executed by the processor, cause the processor to:
  receive sensor data from a sensor associated with an asset, the sensor data representing a tampering event of the asset, wherein the tampering event represents one or both of (1) a distance between a first tape node and a second tape node increasing past a threshold distance, and (2) a tear being detected in circuitry of a single tape node:
  determine whether the tampering event was authorized; and
  in response to the tampering event being unauthorized, thransmit a notification of the tampering event to a mobile device wireless connected to the wireless sensing system.

14. The wireless sensing system of claim 13, the non-transitory memory storing further machine-readable instructions that, when executed by the processor, further cause the processor to:
 determine whether the tampering event occurred within an authorized area; and
 in response to the tampering event occurring outside of the authorized area, transmit the notification.

15. The wireless sensing system of claim 14, wherein said determine, by the wireless sensing system, whether the tampering event occurred within an authorized area comprises:
 receive, via the wireless sensing system and from a local node attached to the asset, a current location of the asset; and
 determine whether the current location of the asset is within the authorized area.

16. The wireless sensing system of claim 13, the non-transitory memory storing further machine-readable instructions that, when executed by the processor, further cause the processor to: scan for one or more wireless nodes; store scan results indicating current wireless nodes responding to the scan; compare the scan results to a logistics schedule; and transmit a logistics alert when the scan results do not correspond to the logistics schedule.

17. A wireless sensing system having a primary electronic logging device (ELD) and a secondary ELD, the secondary ELD comprising:
 at least one processor; and
 a memory communicatively coupled with the at least one processor and storing non-transitory machine-readable instructions that, when executed by the processor, cause the processor to:
  receive tape node data from a tape node associated with an asset proximate to the secondary ELD, the tape node data representing a tampering event performed on the asset;
  compare the tape node data to a list of predetermined events, stored within the memory, the list of predetermined events including one or more predetermined events and corresponding elements of tape node data associated with each of the one or more predetermined events;
  determine, based on the comparison of the tape node data to a list of predetermined events,that the tampering event does not match a predetermined event within the list of predetermined events; and
  execute, in response to the determination that the tampering event does not match a predetermined event, a particular contingency plan, based on the tampering event.

18. The wireless sensing system of claim 17, wherein the non-transitory computer readable instructions further causes the processor to:
 when the tampering event is not a predetermined event, retrieve, from a plurality of wireless nodes associated with the asset, data relating to the tampering event;
 broadcast data, according to the particular contingency plan, to the plurality of wireless nodes associated with the asset; and
 transmit a notification, to the primary ELD of the wireless sensing system, to notify a management system of the wireless sensing system, the notification alerting the management system of the wireless sensing system that the tampering event has occurred.

19. The wireless sensing system of claim 18, wherein transmitting the notification further includes transmitting to a client device, the notification alerting an authorized user of the client device.

20. The wireless sensing system of claim 17, wherein said execute the particular contingency plan further comprises the memory including further non-transitory computer-readable instructions that, when executed by the processor, further cause the secondary ELD to:
 identify the contingency plan as a particular contingency plan, from a set of contingency plans, satisfying a threshold, comprising:
  compare the tampering event to a set of contingency plans stored in the memory;
  determine, based on the comparison of the tampering event with the contingency plan satisfying a threshold, a particular contingency plan; and
  execute instructions contained within the particular contingency plan.

21. The wireless sensing system of claim 20, the wireless sensing system further includes a peripheral wireless network node that is associated with a missing asset wirelessly connected to the secondary ELD, and proximate to the asset, wherein the tampering event is a missing asset, and the particular contingency plan includes instructions for wireless sensing system to re-broadcast ping packets to the peripheral wireless network node associated with the missing asset using a different communications protocol.

22. The wireless sensing system of claim 17, wherein the primary ELD is the tape node designed to wirelessly communicate using Bluetooth, LoRa, Cellular, and GPS.

23. The wireless sensing system of claim 17, wherein the primary ELD is another tape node than the tape node and the primary ELD has increased storage capacity, battery, and processing power than the tape node.

24. The wireless sensing system of claim 17, wherein the tampering event occurred on a storage container.

\* \* \* \* \*